(12) United States Patent
Sakai et al.

(10) Patent No.: US 8,295,425 B2
(45) Date of Patent: Oct. 23, 2012

(54) FAST REACTOR HAVING REACTIVITY CONTROL REFLECTOR

(75) Inventors: Toshiro Sakai, Tokyo (JP); Takanari Inatomi, Tokyo (JP); Hiroshi Nakamura, Tokyo (JP); Kenjiro Fukamichi, Tokyo (JP); Toshiyuki Suzuki, Tokyo (JP); Katsushi Hasegawa, Tokyo (JP); Yasushi Tsuboi, Tokyo (JP); Makoto Kuramochi, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 493 days.

(21) Appl. No.: 12/121,344

(22) Filed: May 15, 2008

(65) Prior Publication Data

US 2009/0190710 A1    Jul. 30, 2009

(30) Foreign Application Priority Data

May 17, 2007  (JP) ................................ 2007-131441
May 9, 2008   (JP) ................................ 2008-123952

(51) Int. Cl.
*G21C 7/06* (2006.01)
(52) U.S. Cl. ......... 376/220; 376/219; 376/327; 376/339
(58) Field of Classification Search .................. 376/220, 376/221, 339, 219, 327, 419, 447
See application file for complete search history.

(56) References Cited

U.S. PATENT DOCUMENTS

| 4,166,003 | A | * | 8/1979 | Bhattacharyya et al. | 376/398 |
| 4,227,967 | A | * | 10/1980 | Zebroski | 376/219 |
| 4,256,538 | A | * | 3/1981 | Scott | 376/362 |
| 4,316,770 | A | * | 2/1982 | Hutter | 376/175 |
| 4,899,968 | A | * | 2/1990 | Eaglin et al. | 248/131 |
| 5,087,412 | A | * | 2/1992 | Bingham et al. | 376/368 |
| 5,378,106 | A | * | 1/1995 | Risley et al. | 414/608 |
| 5,420,897 | A | * | 5/1995 | Kasai et al. | 376/220 |
| 7,139,352 | B2 | * | 11/2006 | Nishiguchi et al. | 376/220 |
| 7,155,613 | B2 | * | 12/2006 | Master et al. | 713/182 |
| 7,158,127 | B1 | * | 1/2007 | Dotson | 345/204 |
| 2005/0220251 | A1 | * | 10/2005 | Yokoyama et al. | 376/220 |
| 2008/0069289 | A1 | * | 3/2008 | Peterson | 376/243 |

FOREIGN PATENT DOCUMENTS

| JP | 6-51082 A | 2/1994 |
| JP | 6-174882 A | 6/1994 |

* cited by examiner

*Primary Examiner* — Ricardo Palabrica
(74) *Attorney, Agent, or Firm* — Foley & Lardner LLP

(57) ABSTRACT

A fast reactor having a reactivity control reflector has a reactor vessel in which a coolant is accommodated, a reactor core which is installed in the reactor vessel and dipped with the coolant, and a reflector installed outside of the reactor core so as to be movable in a vertical direction for controlling the reactivity of the reactor core. The reflector of the fast reactor has a lower neutron reflecting portion having a neutron reflection capability higher than that of the coolant and an upper cavity portion located above the neutron reflecting portion and having a neutron reflection capability lower than that of the coolant. The cavity portion is composed of a plurality of cylindrical hermetically-sealed vessels.

14 Claims, 18 Drawing Sheets

FAST REACTOR HAVING REACTIVITY CONTROL REFLECTOR

BACKGROUND OF THE INVENTION

1. Field of the Invention

The present invention relates to a fast reactor having a reactivity control reflector for controlling the reactivity of a reactor core by moving reflectors upward and downward, and more particularly to a fast reactor having a reactivity control reflector which is excellent in soundness of structure and has high reliability.

This application claims priority from Japanese Patent Application No. 2007-131441, filed May 17, 2007 and Japanese Patent Application No. 2008-123952, filed May 9, 2008, which are incorporated herein by reference in their entirety.

2. Related Art

Patent Document 1 (Japanese Unexamined Patent Application Publication No. 6-174882) discloses an example of conventional fast reactors, which is shown in FIG. 21. The conventional fast reactor 1 has a reactor core 3 which is accommodated in a reactor vessel 2 and in which a nuclear fuel assembly is loaded. The reactor core 3 is formed in an approximately columnar shape, and the outer periphery thereof is surrounded by a core barrel 4 for protecting the reactor core 3. A reflector 5 is installed outside of the core barrel 4. The reflector 5 is coupled with a reflector drive apparatus 6 through a drive shaft 7, and moved upward and downward around the reactor core 3 by driving the reflector drive apparatus 6 to thereby control the reactivity of the reactor core 3.

A cylindrical partition wall 9 is installed outside of the reflector 5 to surround the reflector 5, and a flow path of a primary coolant 8 is formed between the partition wall 9 and the reactor vessel 2. The partition wall 9 is accommodated in the reactor vessel 2, and the flow path of the primary coolant 8 and a neutron shield body 10 are installed. The neutron shield body 10 is installed so as to surround the reactor core 3.

The reactor core 3, the core barrel 4, the partition wall 9, and the neutron shield body 10 are all mounted on a reactor core support plate 11 so as to be supported thereby. An electromagnetic pump 12 is installed above the neutron shield body 10 to circulate the primary coolant 8, and an intermediate heat exchanger 13 is installed above the electromagnetic pump 12. The intermediate heat exchanger 13 performs heat exchange of the primary coolant 8 and a secondary coolant and heats the secondary coolant. The secondary coolant flows from an inlet nozzle 14 into the intermediate heat exchanger 13. After the secondary coolant is subjected to the heat exchange by the intermediate heat exchanger 13 and heated, it is supplied to a steam generator, not shown, from an outlet nozzle 15.

Further, the reflector 5 located around the reactor core 3 of the reactor vessel is arranged as shown in FIG. 22 (refer to Patent Document 2: Japanese Patent Application Laid-Open Publication No. 6-51082). The reflector 5 for controlling the reactivity of the reactor core 3 is composed of a lower neutron reflecting portion 5a and an upper cavity portion 5b. The cavity portion 5b is installed on the neutron reflecting portion 5a and formed of a box member in which a vacuum or a gas 17, which have a neutron reflection capability inferior to that of the coolant 8, is enclosed. The cavity portion 5b can suppress a core reactivity lower than a state in which the outside of the core barrel 4 is covered with the primary coolant 8. It is intended to increase the enrichment of a nuclear fuel by reducing the core reactivity to thereby increase the reactivity life of the reactor core 3.

In conventional fast reactors having the reactivity control reflector, the temperature of the primary coolant 8 is 300° to 550°, about 500° on the reactor core 3 side in the core barrel 4, and about 350° on the neutron shield body 10 side of the partition wall 9, and thus, a temperature difference of about 150° is set between the core barrel 4 and the partition wall 9.

Further, when the primary coolant 8 is reversed on the bottom of the reactor vessel 2, moved upward, and passes through the reactor core 3, since it is heated from about 350° to 500°, the coolant temperature in the core barrel 4 has a temperature difference of about 150° in an axial direction.

Accordingly, since a temperature difference is generated to the neutron reflecting portion 5a and the cavity portion 5b of the reflector 5 in the radius direction and the axial direction thereof, the reflector 5 is thermally deformed by thermal expansion difference due to the temperature difference. When the reactor is shutdown in an emergency due to the deformation of the reflector 5 and the reflector 5 is dropped, there is considered a possibility that the reflector 5 cannot be dropped within a predetermined drop time because it comes into contact with the core barrel 4 and the partition wall 9 in the space therebetween.

In addition to the above, it is also considered that the reflector 5 may be damaged by thermal stress and creep caused by the temperature difference in the reflector 5. Further, when a box-shaped cavity portion is employed as the cavity portion 5b of the reactor 5, a problem arises in how the cavity portion 5b of the reflector 5 is to be arranged to prevent damage and breakage of the box member to prevent buckling due to thermal expansion difference caused by the temperature difference between the core barrel 4 and the partition wall 9.

SUMMARY OF THE INVENTION

A main object of the present invention, which was made in consideration of the circumstances described above, is to provide a fast reactor having a reactivity control reflector which is excellent in soundness of structure of the reflector and has high reliability.

Another object of the present invention is to provide a fast reactor having a reactivity control reflector which realizes a neutron reflecting portion excellent not only in the soundness of structure but also in maintenance property and productivity and has high reliability.

Still another object of the present invention is to provide a fast reactor having the reactivity control reflector in which a cavity portion in the upper portion of a reflector is composed of a plurality of sealed vessels so that it is unlike to be deformed by thermal expansion and thermal stress, the soundness of overall structure is improved, breakage due to vibration and swing is effectively prevented, and reliability is improved.

A further object of the present invention is to provide a fast reactor having a reactivity control reflector in which the soundness of structure of a neutron absorber in the upper portion of a reflector is improved as well as the reactivity control capability of the reflector is secured or increased so that the reactor has a high reliability and a high performance.

To solve the above problems, a fast reactor having a reactivity control reflector according to the present invention includes a reactor vessel in which a coolant is accommodated, a reactor core which is installed in the reactor vessel and dipped with the coolant, and a reflector installed outside of the reactor core so as to be movable in a vertical direction for controlling the reactivity of the reactor core, wherein the reflector has a lower neutron reflecting portion having a neutron reflection capability higher than that of the coolant and an upper cavity portion located above the neutron reflector and having a neutron reflection capability lower than that of the coolant, and the cavity portion has a plurality of cylindrical hermetically-sealed vessels.

To solve the above problems, a fast reactor having a reactivity control reflector according to the present invention includes a reactor vessel in which a coolant is accommodated, a reactor core which is installed in the reactor vessel and dipped with the coolant, and a reflector installed outside of the reactor core so as to be movable in a vertical direction for controlling the reactivity of the reactor core, wherein the reflector includes a neutron reflecting portion disposed on the lower portion thereof for reflecting the neutrons from the reactor core and a cavity portion located above the neutron reflecting portion and having a neutron reflection capability lower than that of the coolant and the cavity portion is composed of a plurality of box-shaped or cylindrical hermetically-sealed vessels held in a frame assembly.

Further, to solve the above problems, a fast reactor having a reactivity control reflector according to the present invention includes a reactor vessel in which a coolant is accommodated, a reactor core which is installed in the reactor vessel and dipped with the coolant, and a reflector installed outside of the reactor core so as to be movable in a vertical direction for controlling the reactivity of the reactor core, wherein the reflector includes a lower neutron reflecting portion for reflecting the neutrons from the reactor core and an upper neutron absorbing portion located above the neutron absorbing portion and having a neutron reflection capability lower than that of the coolant, and the neutron reflecting portion is composed of a SiC material or a material mainly composed of Ni, and the neutron absorbing portion includes neutron absorbing metal such as hafnium, boron, tantalum for absorbing neutrons.

In the present invention having the arrangement described above, the neutron reflector excellent in soundness of structure and productivity can be realized, and a highly reliable fast reactor having a reactivity control reflector can be provided.

Further, the fast reactor having the reactivity control reflector according to the present invention can realize a neutron reflector which is unlike to be deformed by thermal expansion and thermal stress and can provide a reflector which is excellent not only in soundness of structure and maintenance property but also in productivity, less affects core reactivity even if a cavity portion is broken, and can keep the function of the cavity portion.

Further, according to the fast reactor having the reactivity control reflector of the present invention, there can be provided a highly reliable fast reactor with a long life which can increase the reactivity control capability of a reflector. In addition, the soundness of structure can be improved by preventing the breakage of a neutron absorbing portion of a reflector, and an increase of the core reactivity can be also prevented.

BRIEF DESCRIPTION OF THE DRAWINGS

FIGS. 8A and 8B show views showing the mounting state of the upper end and the lower end of a frame assembly disposed to the cavity portion of the reflector, wherein FIG. 8A shows a portion A of FIG. 3, and FIG. 8B shows a portion B of FIG. 3, respectively;

FIGS. 9A and 9B are views showing the connecting portion of cylindrical hermetically-sealed vessels disposed to the cavity portion of the reflector and connected to each other, wherein FIG. 9A is a view showing the engaged state of the hermetically-sealed vessels engaged with each other using a framework, and FIG. 9B is a view showing the concave/convex coupled state of the hermetically-sealed vessels coupled with each other using a concave portion and a convex portion, respectively;

FIGS. 14A and 14B show a reflector disposed outside of a reactor core of the fast reactor shown in FIG. 13, wherein FIG. 14A is a front elevational view of the reflector when viewed from the reactor core, and FIG. 14B is a side elevational view of the reflector;

FIGS. 15A and 15B show the reflector shown in FIGS. 14A and 14B, wherein FIG. 15A is a plan sectional view of a neutron reflecting portion in the lower portion of the reflector, and FIG. 15B is a plan sectional view of a cavity portion in the upper portion of the reflector;

FIGS. 18A and 18B show a reflector installed outside of the reactor core of the fast reactor shown in FIG. 17, wherein FIG. 18A is a front elevational view of the reflector when viewed from the reactor core side, and FIG. 18B is a side elevational view of the reflector;

FIGS. 20A, 20B, and 20C show a neutron reflecting portion in the lower portion of the reflector shown in FIG. 18, wherein FIG. 20A is a plan sectional view of the neutron reflecting portion, FIG. 20B is a partial view of a reflector element when the neutron reflecting portion is viewed from the reactor core, and FIG. 20C is a partial plan sectional view showing the connecting relation of side plates of the reflector element;

DESCRIPTION OF THE PREFERRED EMBODIMENT

An embodiment of a fast reactor having a reactivity control reflector according to the present invention will be explained referring to the accompanying drawings. Note that the terms used in the following description such as "upper/lower", "left/right", and the like are used in an illustrated state or in an actually installed state.

[First Embodiment]

Figure 1:
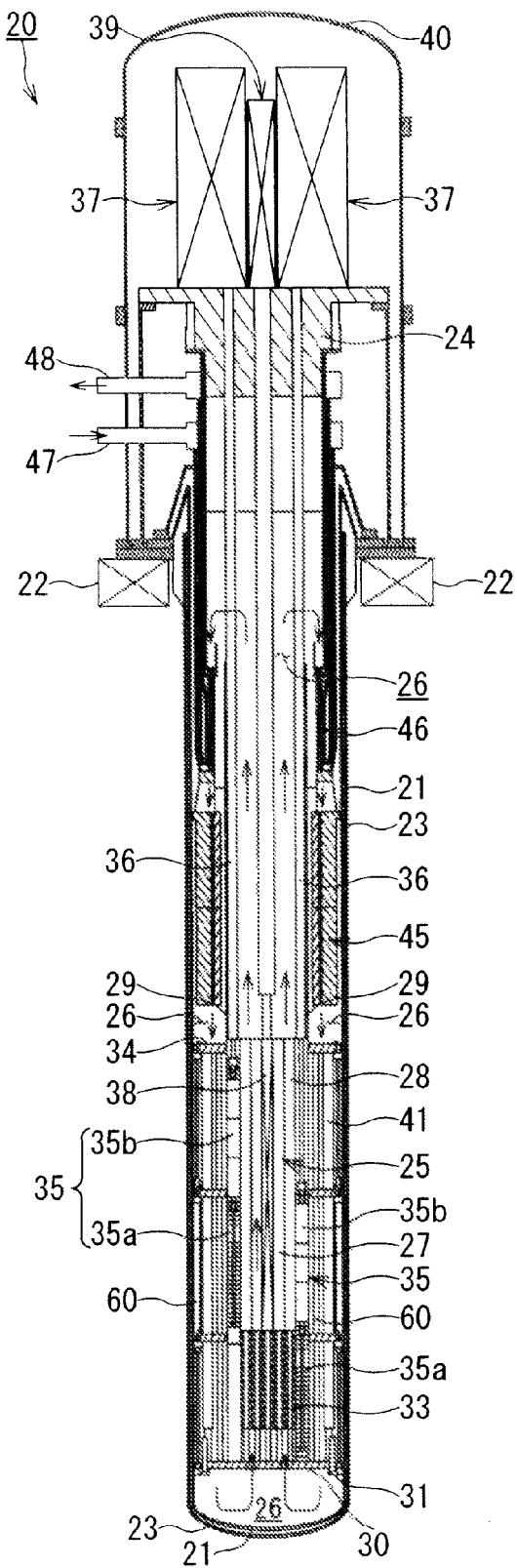
FIG. 1 is a longitudinal sectional view showing a first embodiment of a fast reactor having a reflectivity control reflector according to the present invention.

FIG. 1 is a longitudinal sectional view showing a first embodiment of a fast reactor having a reactivity control reflector according to the present invention.

The fast reactor 20 can be continuously operated from ten and several years to tens of years, for example, about 30 years without replacing nuclear fuel and has a reactor output from 30 MW to hundred and several tens MW (10000 KW to 100000 KW in terms of electric output) and an overall height of 25 m to 35 m, for example, about 30 m. A reactor core height is, for example, about 2.5 m. A coolant is used at a temperature at which liquid sodium does not condense or at a temperature higher than the above temperature, that is, at 200° or higher with an allowance and preferably at 300° to 550°. A coolant temperature is set to 300° to 400°, for example, to 350° in a coolant flow path in a reactor vessel and to 500° to 550°, for example, to about 500° on a reactor core side.

The fast reactor 20 having the reactivity control reflector shown in FIG. 1 is protected by being covered with a guard vessel 23 in which a bottomed cylindrical reactor vessel 21 is supported on a base 22. The top portion of the reactor vessel 21 is closed by a shield plug 24 constituting an upper plug.

A reactor core 25 is accommodated in the reactor vessel 21, whereas the reactor vessel 21 is filled with liquid sodium as a primary coolant 26. A nuclear fuel assembly 27 is loaded in the reactor core 25 which is formed in a columnar shape in its entirety. The outside of the reactor core 25 is surrounded by a core barrel 28 for protection.

A cylindrical partition wall 29 is installed outside of the core barrel 28 at an interval and supported on a reactor core support plate 30 together with the reactor core 25 and the core barrel 28. The reactor core support plate 30 is supported on a reactor core supporting bed 31 installed to the lower portion of a circumferential wall of the reactor vessel 21. The reactor core 25 is provided with an entrance module 23 in the lower portion thereof, whereas the upper portion of the fuel assembly 27 loaded to the reactor core 25 is supported by an upper support plate 34.

Further, a reflector 35 formed in a sleeve-shape (cylindrical or annular shape) is interposed between the core barrel 28 and the partition wall 29. The reflector 35 is coupled with a reflector drive apparatus 37 through a drive shaft 36. The reflector drive apparatus 37 is installed on the upper plug constituting the shield plug 24, and the reflector 35 is moved around the periphery of the reactor core 25 in a vertical direction by driving the reflector drive apparatus 37 to thereby control the reactivity of the reactor core 25.

Further, a reactor shut-off rod 38 is installed to a central portion of the reactor core 25 so that it is free to be inserted into and extracted from the reactor core 25 by driving the reactor shut-off rod drive apparatus 39. The reactor shut-off rod drive apparatus 39 is also installed on the upper plug together with the reflector drive apparatus 37. The reflector drive apparatus 37 and the reactor shut-off rod drive apparatus 39 are accommodated in an accommodation dome 40 so as to be protected.

In contrast, flow paths of the primary coolant 26 are formed between the partition wall 29 and the reactor vessel 21 outside the partition wall 29, and a neutron shield member 41 is installed in the flow path. The neutron shield member 41 is installed on the reactor core support plate 30, and includes the upper portion supported by the upper support plate 34. The neutron shield member 41 shields neutrons radiated from the reactor core 25 passing through or bypassing the reflector 35.

In the reactor vessel 21, an annular electromagnetic pump 45 is installed above the neutron shield member 41, and an intermediate heat exchanger 46 is installed above the electromagnetic pump 45. The electromagnetic pump 45 and the intermediate heat exchanger 46 are arranged, for example, as one unit or integrated with each other. The electromagnetic pump 45 circulates the primary coolant 26 in the reactor vessel 21 as shown by solid arrows so that it flows from an upper side to a lower side in the coolant flow path.

Further, the primary coolant 26 and a secondary coolant are guided to a tube side and a shell side of the intermediate heat exchanger 46 so that they can be subjected to heat exchange. The secondary coolant flows in from an inlet nozzle 47 and reaches the intermediate heat exchanger 46. After the secondary coolant is heat-exchanged with the primary coolant 26 in the intermediate heat exchanger 46 so that the temperature thereof is increased, it is supplied from an outlet nozzle 48 to a steam generator, not shown, outside of the reactor vessel 21. The secondary coolant is also composed of liquid sodium likewise the primary coolant.

Figure 2:
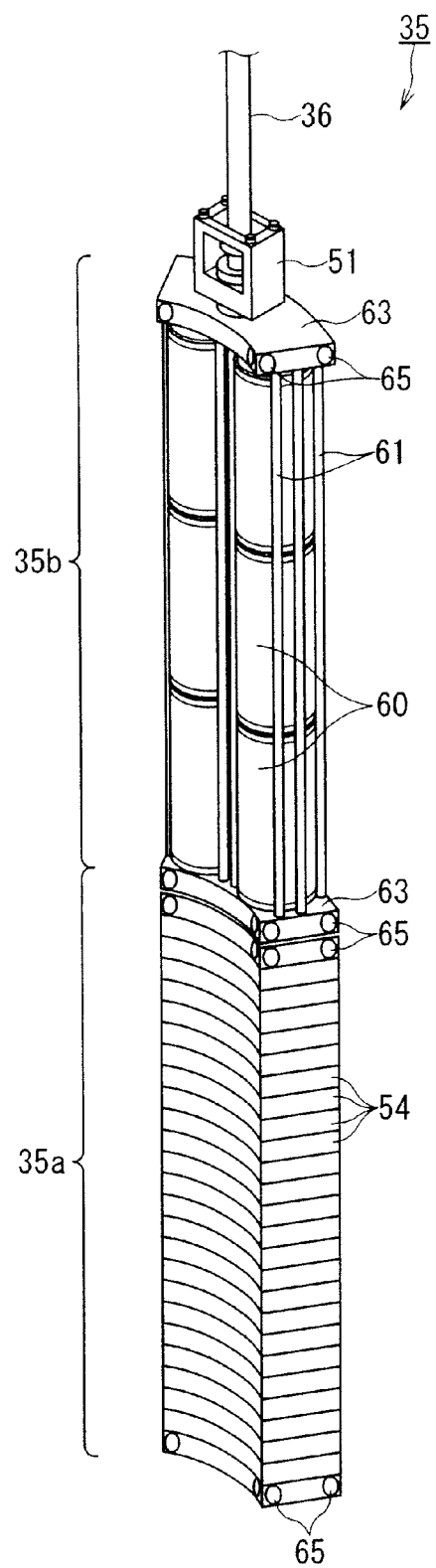
FIG. 2 is a perspective view showing the outer appearance of the reflector installed around a reactor core of the fast reactor shown in FIG. 1.
Figure 3:
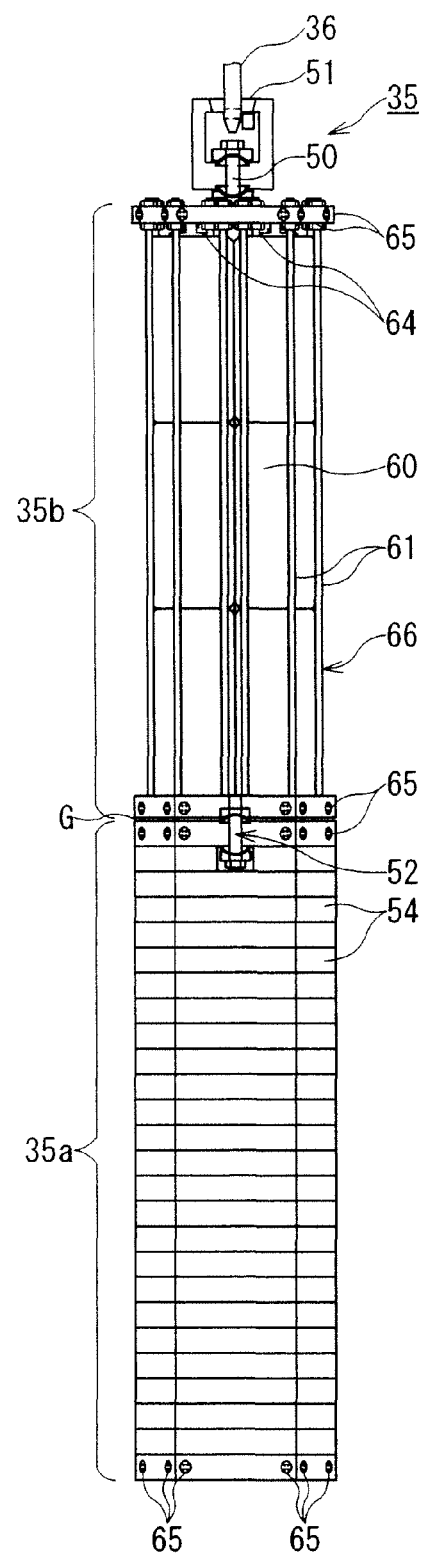
FIG. 3 is a front elevational view of the reflector as viewed from the reactor core side.
Figure 4:
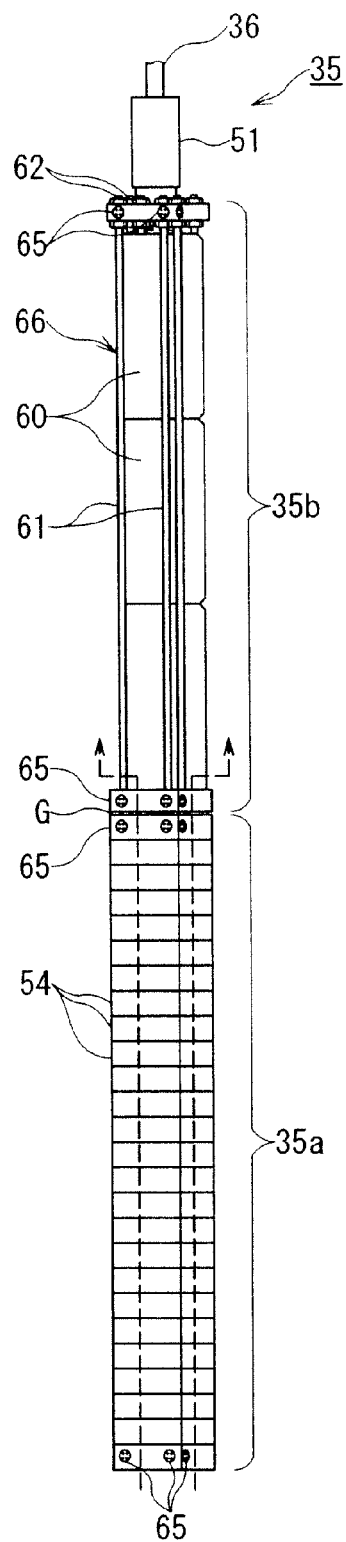
FIG. 4 is a side elevational view of the reflector.

In contrast, the reflector 35 has an independent segment structure in which the reflector 35 is divided into several to ten and several pieces of reflector segments and is formed in an approximately cylindrical shape (sleeve-shape) or in an annular shape in their entirety by coupling the reflector segments with each other. As shown in FIGS. 2 to 4, each reflector segment (hereinafter, simply referred to as reflector) has a neutron reflecting portion 35a as a lower portion or a lower region and a cavity portion 35b as an upper portion or an upper region.

FIG. 2 is a perspective view showing the outside appearance of the reflector 35, FIG. 3 is a front elevational view of the reflector 35, and FIG. 4 is a side elevational view showing the reflector 35, respectively.

The reflector 35 is coupled with the drive shaft 36 of the reflector drive apparatus 37 through a universal joint 50 and a joint 51 so as to be supported thereby, whereas the cavity portion 35b of the reflector 35 is coupled with the neutron reflecting portion 35a through a universal joint 52, and the neutron reflecting portion 35a, and the reflector 35 is arranged to have a multijoint structure so as to absorb thermal expansion, thermal deformation, and further vibration.

Figure 5:
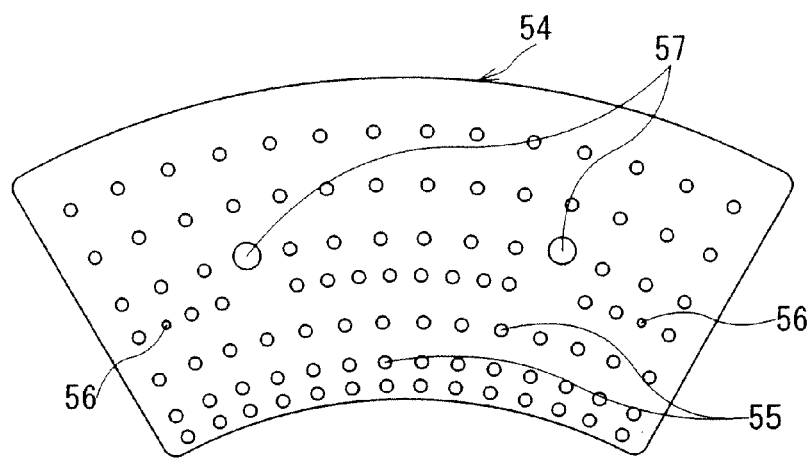
FIG. 5 is a plan sectional view of a neutron reflecting portion installed in the lower portion of the reflector.

Further, the neutron reflecting portion 35a of the reflector 35 is composed of a plurality of laminated metal plates 54. As shown in FIG. 5, each metal plate 54 is formed in a fan shape or a trapezoid shape in a plan view, whereas a plurality of coolant flow paths 55 are formed inside of each metal plate 54. The metal plates 54 are positioned by being engaged with each other at several positions through a concave portion and convex portion by positioning pin 56 so that the coolant flow paths 55 communicate with each other. Then, the metal plates 54 are coupled integrally with each other in their entirety using the metal plates 54 of the upper and lower ends of the neutron reflecting portion 35a using a coupling means having a coupling rod 57. Since the respective metal plates 54 are laminated, productivity can be improved, and further thermal expansion and thermal stress being generated can be suppressed to a low level by being dispersed and absorbed.

The neutron reflecting portion 35a is composed of the plurality of laminated metal plates 54 or SiC plates, not shown, the respective metal plates 54 are composed of metal having a main component of chromium-molybdenum steel, nickel (Ni) steel, and nickel or inconel. Inconel is a corrosion- and heat-resistant alloy containing chromium and iron.

The neutron reflecting portion 35a of the reflector 35 can cool the gamma heat, which is generated by the mutual action between the neutrons and the neutron reflecting portion 35a, by the primary coolant 26 through the plurality of coolant flow paths 55 formed to communicate with each other through the respective metal plates 54 or SiC plates so that the temperature of the neutron reflecting portion 35a can be reduced.

Further, the coolant flow paths 55 formed to the respective laminated metal plates 54 or SiC plates are made more dense on the reactor core 25 (inner periphery) side than on the reactor vessel 20 (outer periphery) side. The number of the respective coolant flow paths 55 is larger, on the reactor core 25 side, than on reactor vessel 20 side so that the cool capability to the gamma heat which is more generated on the reactor core 25 side can be enhanced. With this operation, the overall temperature of the metal plates 54 of the neutron reflecting portion 35a can be made uniform so that deformation due to thermal expansion can be suppressed.

On the other hand, the cavity portion 35b of the reflector 35 is arranged as shown in FIGS. 2 to 4 and has a plurality of cylindrical hermetically-sealed vessels 60. Now, a case, in which each hermetically-sealed vessel 60 is formed in a cylindrical shape, will be explained herein. The cylindrical hermetically-sealed vessels 60 are stacked in columns of two pieces by three pieces.

Figure 6:
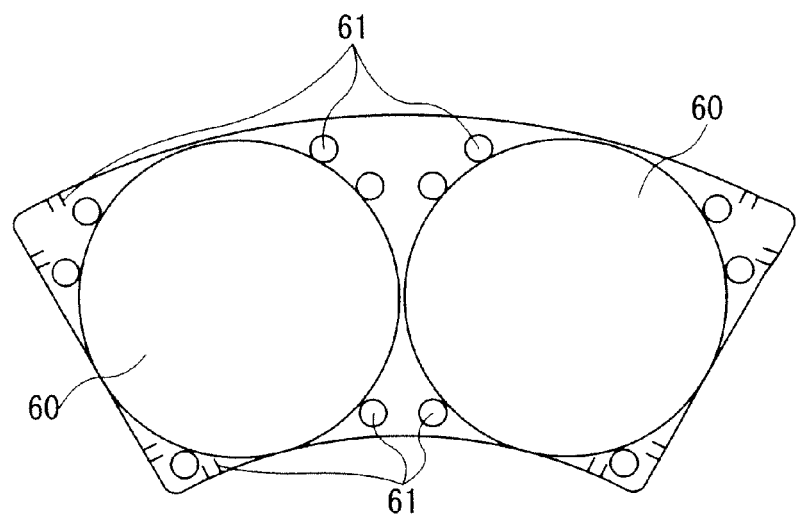
FIG. 6 is a plan sectional view of a cavity portion disposed in the upper portion of the reflector.

End plates 63 are disposed to the upper and lower ends of the hermetically-sealed vessels 60 stacked in the columns of two pieces by three pieces. The upper and lower end plates (metal plates) 63 are coupled with each other at four corners and in a central portion by a coupling means 62 such as bolts, nuts, and the like using supporting rods 61, so that a frame assembly 66 is arranged. The hermetically-sealed vessels 60 are arranged side by side as shown in FIG. 6, and each three columns of the hermetically-sealed vessels 60 are stacked and accommodated in the basket-shaped frame assembly 66 composed of the coupling means 62 and the supporting rods 61. The frame assembly 66 surrounds the hermetically-sealed vessels 60 in the columns of 2 by 3 and holds them integrally.

On the other hand, the cylindrical hermetically-sealed vessels 60 of the cavity portion 35b is made vacuum or enclosed with an inert gas such as He, Ar, which has a neutron reflection capability inferior to that of the coolant. Since the cylindrical hermetically-sealed vessel 60 is employed in the cavity portion 35b, the reflector can be made excellent in productivity and can be manufactured at a low cost, whereas it can be provided with a structure resistant to deformation and buckling due to thermal deformation and external pressure. Even if one of the hermetically-sealed vessels 60 is broken, a problem arises only in that only one vessel is filled with the coolant penetrated thereinto, and thus the soundness of the remaining hermetically-sealed vessels 60 can be kept and the function of the cavity portion can be maintained.

Further, since the cylindrical hermetically-sealed vessels 60 are employed, the coolant flow paths can be sufficiently secured between the cavity portion 35b, the core barrel 28, and the partition wall 29, thereby enhancing the cooling capability to the gamma heat, which is generated more on the reactor core 25 side.

The respective hermetically-sealed vessels 60 are stably accommodated inside of the supporting rods 61 of the frame assembly 66 disposed around the hermetically-sealed vessels 60 like a basket. The supporting rods 61 act as a guide for restraining the hermetically-sealed vessels 60 in a horizontal direction.

In the case of the reflector 35 shown in FIG. 2, the hermetically-sealed vessels 60 in total of six pieces are stacked, for example, vertically in three pieces and horizontally in two pieces side by side inside of the frame assembly 66 in the supporting rods 61. Since the cavity portion 35b of the reflector 35 is divided into the plurality of independent hermetically-sealed vessels 60, a plurality of, for example, six independent hermetically-sealed vessels can be formed in the cavity portion 35b. As a result, when any one of the hermetically-sealed vessels is broken, the primary coolant 26 leaks into the hermetically-sealed, and the vacuum or the gas is lost from the inside thereof, the control of the reactor core is less affected thereby than a case in which only one hermetically-sealed vessel is formed. Here, a substance having a neutron reflection capability inferior to that of the primary coolant 26 may be enclosed in the hermetically-sealed vessels 60 in addition to the vacuum and the gas enclosed therein. The substance is metal such as boron, hafnium, tantalum, and the like or a compound thereof.

Further, a thermal expansion absorption means 64 composed of an elastic member is attached to at least one of the upper and lower ends of the cavity portion 35b of the reflector 35 so as to absorb thermal expansion difference in the vertical direction caused between the framework of the supporting rods 61 and the hermetically-sealed vessels 60 and absorb the displacement of the hermetically-sealed vessels 60 in the vertical direction caused by thermal expansion of the gas therein.

Although thermal expansion absorption means 64 is composed of a coil spring in an example shown in FIG. 3, it may be composed of a disc spring or a sheet spring. Since a small load is applied by thermal expansion absorption means 64, and the hanging load of the neutron reflecting portion 35a is applied to the supporting rods 61, a load applied to the hermetically-sealed vessels 60 is sufficient small. Further, since the hermetically-sealed vessels 60 can suppress a mechanical load excluding the external pressure from the primary coolant 26 to a low level, the soundness of the hermetically-sealed vessels 60 can be kept.

Figure 7:
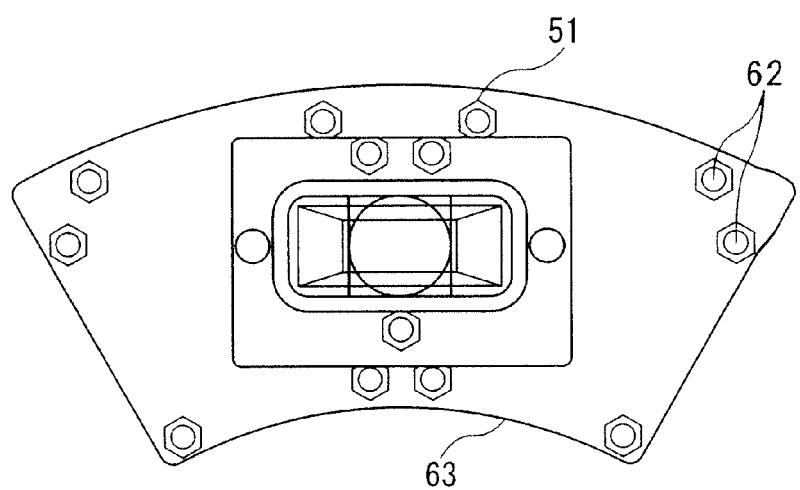
FIG. 7 is a plan view of a joint showing a coupling structure for coupling the reflector with a drive shaft of a reflector drive apparatus.

Further, as shown in FIGS. 3 and 7, the joint 51 is disposed above the cavity portion 35b of the reflector 35 and connected to the drive shaft 36 hanged down from the reflector drive apparatus 37 (refer to FIG. 1) by a remote control. The joint 51 is connected to the cavity portion 35b by the universal joint 50. Further, the cavity portion 35b is also connected to the neutron reflecting portion 35a by the universal joint 52.

As described above, warping, which is caused by thermal expansion due to the temperature difference of the reactor in a radius direction and the vertical direction, can be suppressed, and the reflector 35 can be freely and smoothly dropped within a predetermined drop time when it is shutdown in an emergency by connecting the respective components of the reflector 35 to each other by the universal joints 50, 52, thus performing a multijoint movement.

Further, since the reflector has a structure such that pads 65 are disposed to the upper and lower ends of the neutron reflecting portion 35a of the reflector 35 and to the upper and lower ends of the cavity portion 35b to keep gaps therebetween, the gap between the reflector 35 and the core barrel 28 can be kept constant so that the reflector 35 is dropped smoothly within the predetermined drop time by increasing a degree of drop when the reactor is shutdown in an emergency. The pads 65 may be attached by welding or using screws.

A gap G is formed between the neutron reflecting portion 35a and the cavity portion 35b so that the primary coolant 26, which flows in from below the reflector 35 into the flow paths 55 formed to the neutron reflecting portion 35a and cools the neutron reflecting portion 35a, flows out from the gap G. Further, the universal joint 52 is attached to a center portion of the gap G so that the neutron reflecting portion 35a and the cavity portion 35b are bent.

Figure 8A:
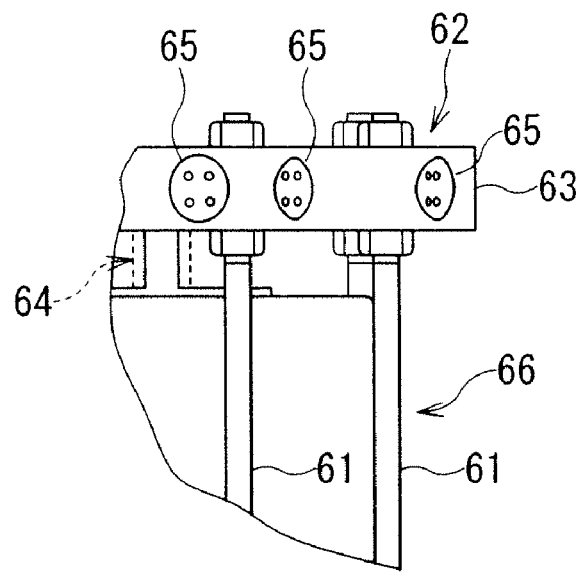
Figure 8B:
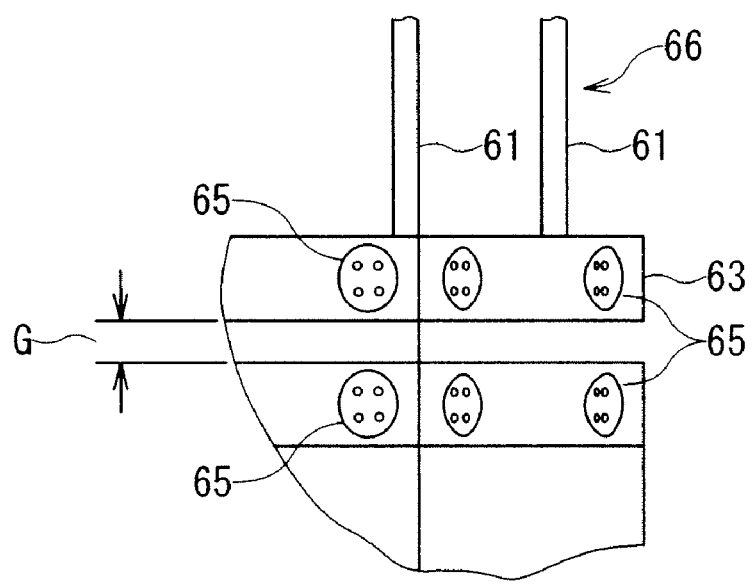

FIGS. 8A and 8B are views showing the mounting structures of the upper and lower portions of the respective supporting rods 61 of the frame assembly 66 constituting the cavity portion 35b of the reflector 35. Screw threads are cut to the extreme ends of the supporting rods 61, and a coupling member 62 is arranged by screwing nuts to the screw portions of the supporting rods 61. The hanging load of the neutron reflecting portion 35a is arranged to act on the respective supporting rods 61.

Further, a plurality of cylindrical hermetically-sealed vessels 60 are stacked in the cavity portion 35b of the reflector 35 in a column order. The hermetically-sealed vessels 60 of the cavity portion 35b are restrained in the vertical direction by thermal expansion absorption means 64 as the elastic member (refer to FIGS. 3 and 8A). The hermetically-sealed vessels 60 are restrained in a horizontal direction by forming concave portions and convex portions to the upper and lower ends of the hermetically-sealed vessels 60 and engaging them with each other.

Figure 9A:
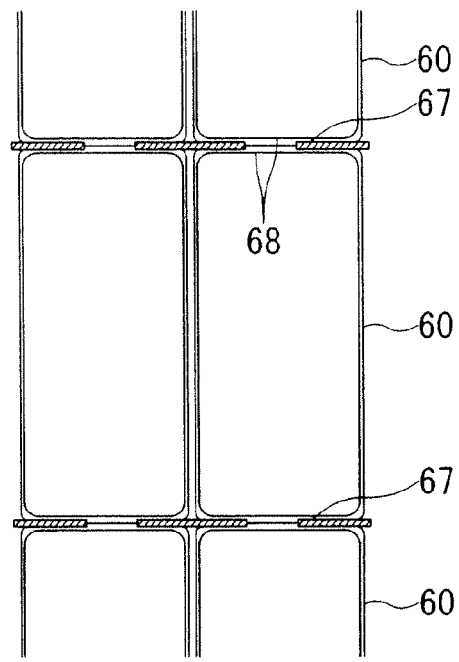

When the convex portions are formed to the joint surfaces of the hermetically-sealed vessels 60, the hermetically-sealed vessels 60 are restrained by abutting the convex portions against each other making use of an intermediate rib of the framework 67, to which openings are formed, and engaging the convex portions with the framework 67 as shown in FIG. 9A. On the other hand, when the convex portions are formed to the end surfaces a hermetically-sealed vessel 60 and the recessed portions are formed to the end surface of a hermetically-sealed vessel 60 confronting the above vessel 60, the hermetically-sealed vessels 60 are restrained by directly subjecting them to a concave/convex coupling 69 as shown in FIG. 9B.

Figure 9B:
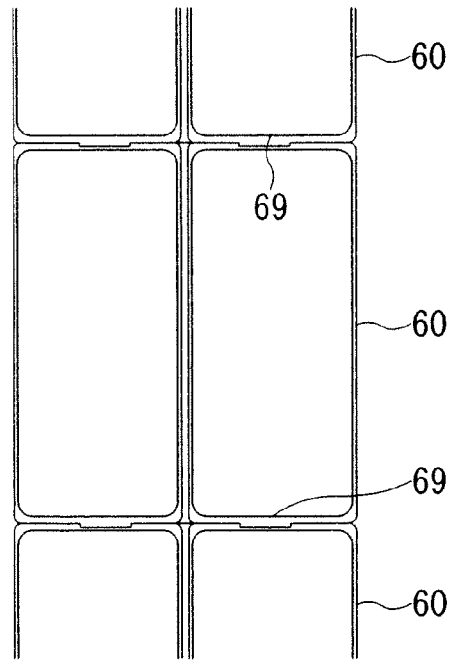

As described above, the connecting portions of the hermetically-sealed vessels 60 can be restrained by the engagement of the hermetically-sealed vessels 60 with the intermediate rib of the framework 67 or by the concave/convex coupling of the hermetically-sealed vessels 60 as shown in FIGS. 9A and 9B.

The plurality of hermetically-sealed vessels 60 are restrained in the vertical direction and in the horizontal direction by coupling them with the cavities 35b of the reflector 35 and coupling them between the upper and lower end plates 63 by the coupling means 62 or by combining the support structure of the hermetically-sealed vessels 60, thermal expansion absorption means 64, and the engagement structure of the hermetically-sealed vessels 60, that is, by combining the supporting rods 61 of the frame assembly 66 disposed like the basket and the engagement structure of the hermetically-sealed vessels 60, thereby effectively preventing the hermetically-sealed vessels 60 from being damaged by excessive vibration and swing caused when the reactor is installed, operated, and shutdown in an emergency, and when earthquake and the like occur.

In the fast reactor 20 having the reactivity control reflector shown in the embodiment, since the reflector 35 is composed of the plurality (several pieces to ten and several pieces) of the reflector segments coupled with each other in a circumferential direction so as to independently rise and fall to control the reactivity of the reactor core 25 as well as the neutron reflecting portion 35a of the reflector 35 is integrally composed of the plurality of laminated metal plate 54, and the thermal expansion and thermal stress generated to the respective components can be dispersed and absorbed. However, the cavity portion 35b of the reflector 35 is constructed by assembling the plurality of cylindrical hermetically-sealed vessels 60. As a result, there can be provided a highly reliable fast reactor which provides the neutron reflecting portions excellent in soundness of structure, maintenance property and productivity.

[Modification of First Embodiment]

Figure 10:
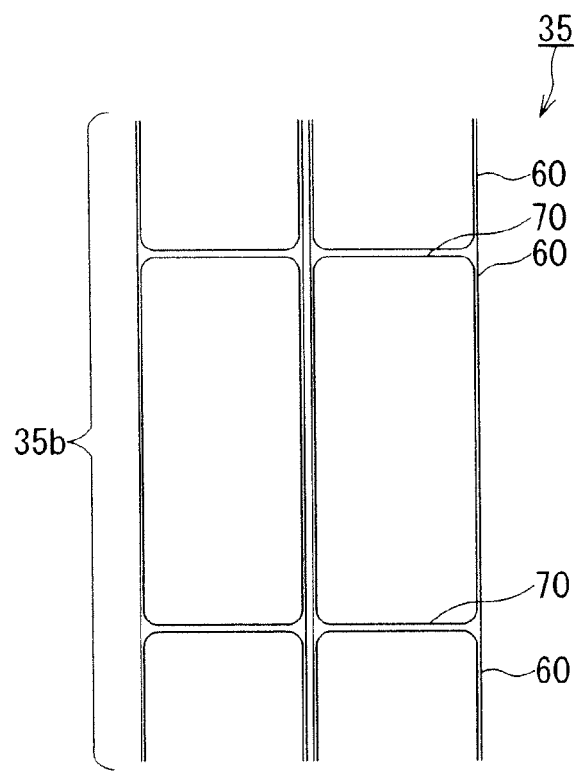
FIG. 10 is a view showing a modification of the fast reactor having the reactivity control reflector and shows the integrally coupled state of cylindrical hermetically-sealed vessels disposed to a cavity portion of a reflector.

FIG. 10 shows a modification of the first embodiment of the fast reactor having the reactivity control reflector.

Since the overall arrangement of a fast reactor having a reactivity control reflector shown in the modification is not different from that shown in FIGS. 1 to 8, the same arrangements are denoted by the same reference numerals and the explanation thereof is omitted.

In FIG. 10, a cavity portion 35b of a reflector 35 is composed of a plurality of cylindrical hermetically-sealed vessels 60 in total of, for example, six pieces, in which two pieces are arranged horizontally in rows and three pieces are stacked vertically in column, and the hermetically-sealed vessels 60 of the cavity portion 35b are arranged as an integral structure by being welded to partition wall 70. The respective hermetically-sealed vessels 60 of the cavity portion 35b may be arranged as the integral structure by welding each column thereof to the partition wall 70 or welding both the two columns to the partition wall 70.

In a reflector 35 shown in the modification, the hermetically-sealed vessels 60 of the cavity portion 35b are divided into, for example, two vessels arranged horizontally and three vessels stacked vertically to reduce the influence relating to a reactor core control when the reactor core is broken. When an engagement structure is employed to the hermetically-sealed vessels 60 by forming concave/convex portions to the upper and lower ends of them, since the structural members of the upper and lower ends of the hermetically-sealed vessels 60 are overlapped with each other, reactivity may be increased and the function of the cavity portion 35b may be lowered.

To cope with this problem, the hermetically-sealed vessels 60 are arranged as an integral structure by welding cylindrical members with the partition wall 70 in place of an engagement structure so that the hermetically-sealed vessels 60 are divided, and the divided portions are supported in a horizontal direction. Employment of the integral structure will further reduce the volume of a structure member more than the engagement structure using the concave/convex portions, which enhances the function of the cavity portion 35b by lowering the reactivity thereof.

According to the reflector 35 of the modification, there can be provided a highly reliable fast reactor having a reactivity control reflector by realizing a neutron reflector excellent in soundness of structure and functional property.

[Second Embodiment]

Figure 11:
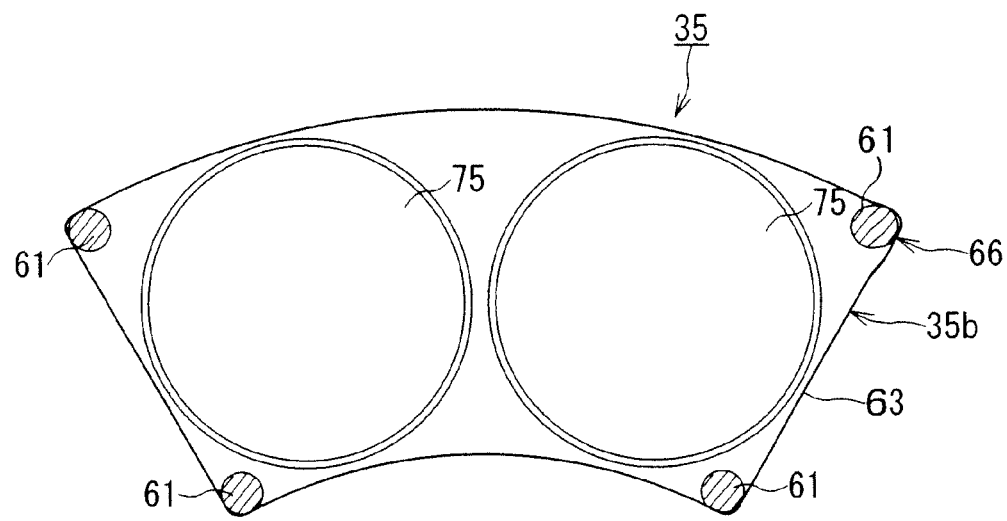
FIG. 11 shows a second embodiment of the fast reactor having the reflectivity control reflector according to the present invention and is a plan sectional view of a cavity portion for forming the upper portion of a reflector.

FIG. 11 is sectional plan view in an enlarged scale of a reflector representing a second embodiment of the fast reactor having the reactivity control reflector.

A fast reactor shown in the second embodiment is improved in a cavity portion 35b of a reflector 35. Since the other arrangement of the first reactor is the same as that of the fast reactor having the reactivity control reflector shown in FIGS. 1 to 8, the same arrangements are denoted by the same reference numerals and the explanation thereof is omitted.

The cavity portion 35b of the reflector 35 is formed as an extending line shape above the region of a neutron reflecting portion 35a disposed below, and two cylindrical hermetically-sealed vessels 75 having a maximum diameter, which can be accommodated in the region of the cavity portion 35b surrounded by the extending line, are disposed side by side.

The cavity portion 35b of the reflector 35 shown in FIG. 11 is arranged such that the cylindrical hermetically-sealed vessels 75 having the maximum diameter, which can be accommodated in the region of the cavity portion 35b, are disposed in a different manner. The two cylindrical hermetically-sealed vessels 75 are disposed side by side in the cavity portion 35b, and a frame assembly 66 is arranged by inserting supporting rods 61 into the four corners of upper and lower fan-shaped end plates 63 and coupling them with each other by a coupling means 62. The two cylindrical hermetically-sealed vessels 75 are accommodated in the frame assembly 66 and integrated with each other. The hermetically-sealed vessels 75 have a wall thickness of 3 mm to 5 mm.

Since the cavity portion 35b is arranged by disposing the two hermetically-sealed vessels 75 side by side, the volume of a structural member of the hermetically-sealed vessels 75 can be reduced. The structural member of the hermetically-sealed vessels 75 is arranged so as to have a minimum distance in the diameter direction of a reactor, and the hermetically-sealed vessels 75 having the maximum size is accommodated in neutron reflecting portion 35a. Since the two cylindrical hermetically-sealed vessels 75 are disposed side by side in the cavity portion 35b of the reflector 35, there can be realized the neutron reflector which has the reduced number of the hermetically-sealed vessels 75, and the reflector can be easily manufactured because the hermetically-sealed vessels 75 are formed in the cylindrical shape, and there are provided an excellent soundness of structure and a cavity performance, thus providing a highly reliable fast reactor having a reactivity control reflector.

[Modification of Second Embodiment]

Figure 12A:
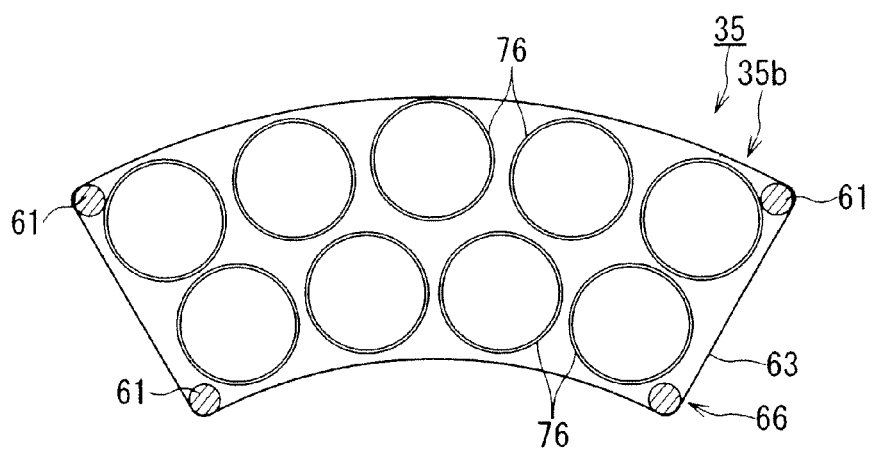
FIGS. 12A, 12B, and 12C show modifications of the cavity portion of FIG. 11 and are plan sectional views showing the cavity portion having a different mode, respectively.
Figure 12B:
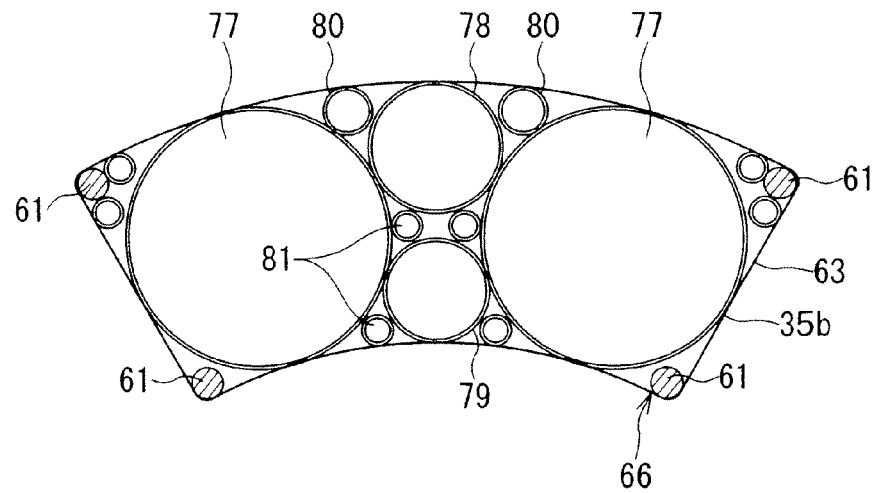
Figure 12C:
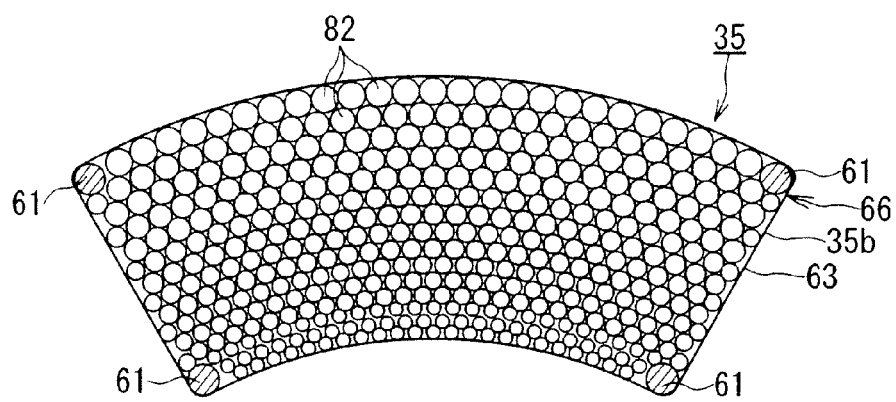

FIGS. 12A to 12C represent a modification of the second embodiment of the fast reactor having the reactivity control reflector.

In FIGS. 12A to 12C, the overall arrangement of a fast reactor having a reactivity control reflector is not different from that of the first embodiment shown in FIGS. 1 to 8 except for a cavity portion 35b of a reflector 35 disposed to the fast reactor, in which arrangement of the hermetically-sealed vessels is changed according to design condition. Accordingly, the same arrangements are denoted by the same reference numeral and the explanation thereof is omitted.

In FIG. 12A, a plurality of, for example, nine hermetically-sealed vessels 76, which have a medium diameter, smaller than the diameter of the hermetically-sealed vessels 75 disposed in FIG. 11, are disposed in the cavity portion 35b of the reflector 35 in a column state. The respective hermetically-sealed vessels 76 are selected so as to have the same diameter. Since the hermetically-sealed vessels 76 having the same diameter are manufactured, they can be manufactured easily with reduced cost.

In FIG. 12B, cylindrical hermetically-sealed vessels 77, 78, 79, 80 having a plurality of different diameters are disposed so that the volume of the cavity portion 35b of the reflector 35 which is occupied by a vacuum or an inert gas becomes maximum.

Further, in FIG. 12C, a lot of hermetically-sealed vessels 82 having a small diameter are disposed in the cavity portion 35b of the reflector 35 to minimize the influence of the hermetically-sealed vessels 82 to the core reactivity of the cavity portion 35b when the hermetically-sealed vessels 82 are broken. The hermetically-sealed vessels 82 may have a different diameter, for example, which may be gradually reduced or increased from the hermetically-sealed vessels located on an outer periphery side to the hermetically-sealed vessels located on an inner periphery side.

In the cavities 35b of the reflector 35 shown in FIG. 12A to FIG. 12C, the respective hermetically-sealed vessels can be also manufactured easily by forming them in the cylindrical shape, and further a highly reliable fast reactor having the reactivity control reflector can be provided by realizing a neutron reflecting portion excellent in soundness of structure and performance.

In the cavity portion 35b of the reflector 35 shown in FIGS. 12A to 12C, a plurality of cylindrical hermetically-sealed vessels 76 to 82, which are disposed in the frame assembly 66, are designed such that the volume of the solid portion occupied by the structure member of the respective cylindrical hermetically-sealed vessels 76 to 82 is 20% or less and preferably 15% or less of the entire volume of the cavity portion 35b. In other words, the respective cylindrical hermetically-sealed vessels 76 to 82 are designed such that the volume occupied by the space of them is 80 vol % of the entire volume of the cavity portion 35b.

Further, a large diameter pipes having a wall thickness of 3 to 5 mm and small diameter pipes having a wall thickness of 1 to 2 mm are appropriately selected to the cylindrical hermetically-sealed vessels 75 to 82 disposed to the cavity portion 35b. The hermetically-sealed vessels 75 to 82 may be formed of ferrite steel having a small neutron absorption capability or a hafnium pipe having a neutron absorption capability which is not deteriorated for a long period. Since the neutron absorption capability of the hafnium pipe is less deteriorated because it has a lot of hafnium isotopes, it is suitable for a long life.

[Third Embodiment]

Next, a third embodiment of the fast reactor having the reactivity control reflector according to the present invention will be explained with reference to FIGS. 13 to 15B.

Since the overall arrangement of a fast reactor 20A of the third embodiment is not different from that of the fast reactor 20 of the first embodiment except the structure of a reflector, the same arrangements are denoted by the same reference numerals and the explanation thereof is simplified.

Figure 13:
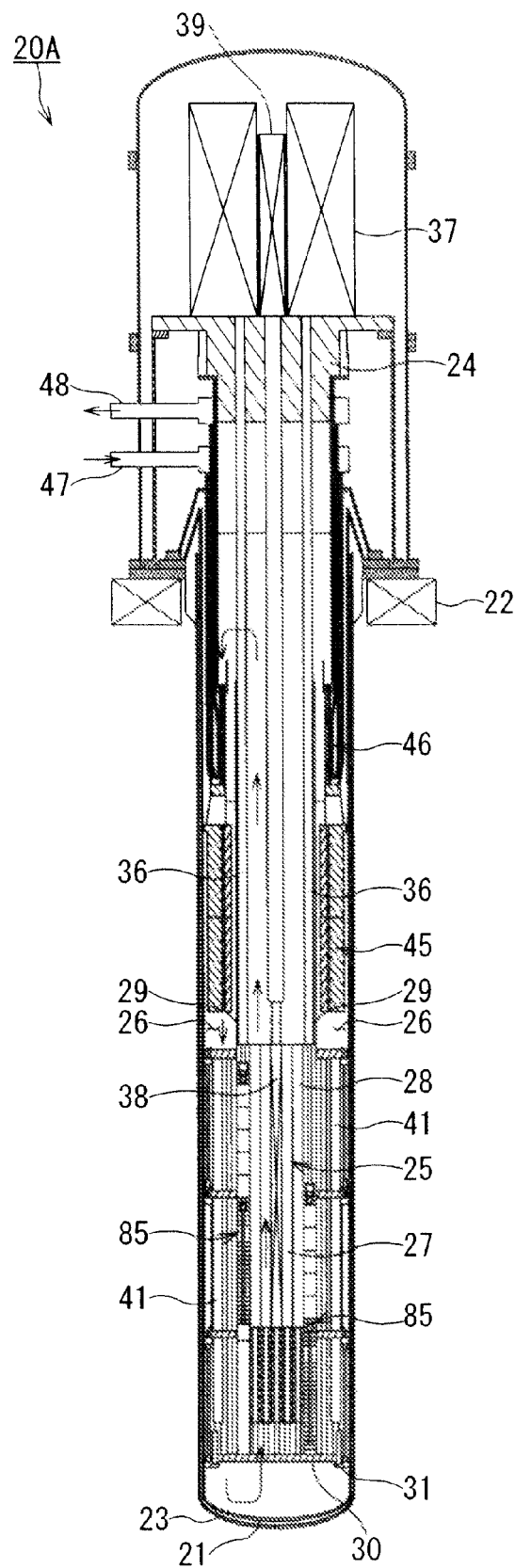
FIG. 13 is a longitudinal sectional view showing a third embodiment of the fast reactor having the reactivity control reflector according to the present invention.

As shown in FIG. 13, the fast reactor 20A having the reactivity control reflector has a reactor vessel 21 in which a primary coolant 26 is accommodated, a reactor core 25 installed in the reactor vessel 21 and dipped into the primary coolant 26, and a reflector 85 which is vertically movably installed outside of the periphery of the reactor core 25 so as to control the reactivity of the reactor core 25 by adjusting the leakage of the neutrons generated from the reactor core 25 by moving in the vertical direction.

Figures 14A, 14B:
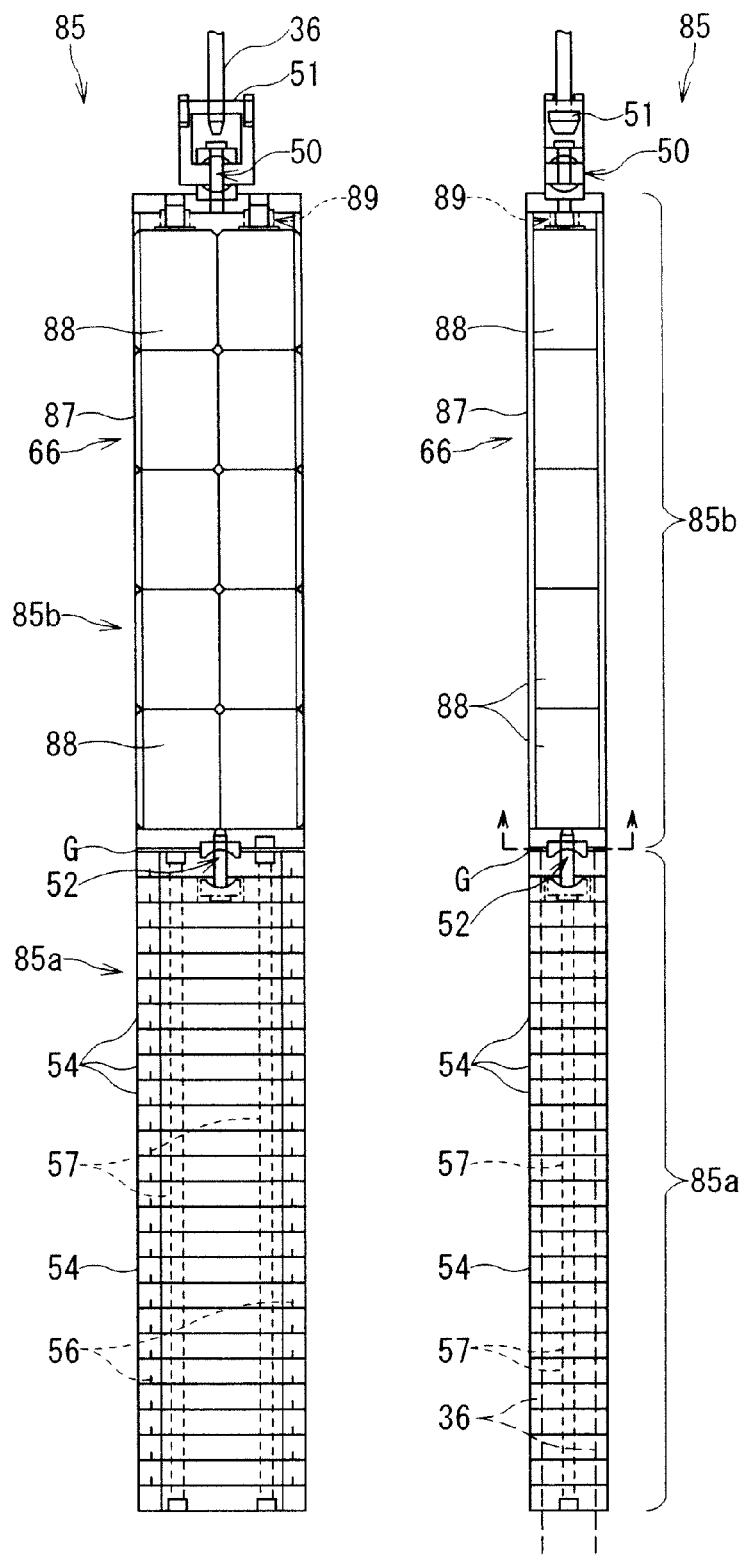

As shown in FIGS. 14A and 14B, the reflector 85 has a neutron reflecting portion 85a having a neutron reflection capability higher than that of the primary coolant 26, and a cavity portion 85b which is located on the neutron reflecting portion 85a and has a neutron reflection capability lower than that of the primary coolant 26. FIG. 14A is a front elevational view of the reflector 85 as viewed from a front surface, FIG. 14B is a side view of the reflector 85 as viewed from a side surface.

Since the neutron reflection capability of the neutron reflecting portion 85a is higher than that of the primary coolant 26, the reaction of the reactor core 25 can be activated.

Specifically, the neutron reflecting portion 85a reflects the neutrons emitted by the nuclear reaction of the nuclear fuel in the reactor core 25 to the reactor core 25, so that the nuclear reaction can be continued in the reactor core 25.

On the other hand, since the neutron reflection capability of the cavity portion 35b is lower than that of the primary coolant 26, the neutrons emitted by the nuclear reaction (nuclear fission) in the reactor core 25 further passes therethrough. Accordingly, the cavity portion 35b can suppress the nuclear reaction of the reactor core 25. As a result, the reaction life of the reactor core 25 can be increased.

Figure 15A:
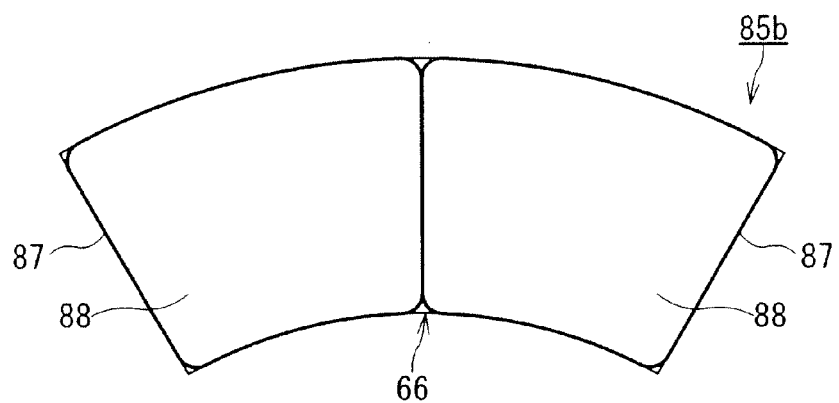

Further, as shown in FIGS. 14A and 14B, the neutron reflecting portion 85a is composed of a plurality of laminated metal plates 54. As shown in FIG. 15A, the metal plates 54 are provided with a plurality of coolant flow paths 55 in which the primary coolant 26 flows. Further, the number of the coolant flow paths 55 is made larger on the reactor vessel 21 side than that on the reactor core 25 side. FIG. 15A is a lateral sectional view of the metal plate 54 of the neutron reflecting portion 85a.

As shown in FIG. 13, a core barrel 28 is installed outside of the periphery of the reactor core 25. The reactor vessel 21 is covered with a guard vessel 23. Further, a fuel assembly 27 is loaded in the reactor core 25.

As shown in FIGS. 14A and 14B, a drive shaft 36 is coupled with the upper end of the cavity portion 85b through a universal joint 50 and a joint 51, and a reflector drive apparatus 37 is coupled with the upper end of the drive shaft 36. The neutron reflecting portion 85a is coupled with the cavity portion 85b through a universal joint 52. Further, as shown in FIG. 13, the periphery of the upper end of the drive shaft 36 is closed by an upper plug 24.

On the other hand, as shown in FIG. 13, a partition wall 29 is installed outside of the reflector 85 so as to surround the reflector 85 and to constitute the inner walls of the flow paths of the primary coolant 26. The reactor vessel 21 installed outside of the partition wall 29 constitutes the outside walls of the flow paths of the primary coolant 26 with a gap between it and the partition wall 29. Neutron shield members 41 are disposed in the flow paths of the primary coolant 26 so as to surround the reactor core 25. The reactor core 25, the core barrel 28, the partition wall 29, and the neutron shield members 41 are all mounted on a reactor core support plate 30 so as to be supported thereby. The reactor core support plate 30 is supported on a reactor core support table 31 attached to the inner periphery of the reactor vessel 21.

On the other hand, as shown in FIG. 13, a reactor shut-off rod drive apparatus 39 is disposed on the upper surface of the upper plug 24. The reactor shut-off rod drive apparatus 39 is coupled with a reactor shut-off rod 38 extending downward. The reactor shut-off rod drive apparatus 39 and the reflector drive apparatus 37 are covered with an accommodation dome 40.

Further, an electromagnetic pump 45 for circulating the primary coolant 26 and an intermediate heat exchanger 46 for performing heat exchange between the primary coolant 26 and a secondary coolant, not shown, composed of liquid sodium are disposed in the reactor vessel 21. Further, after the secondary coolant flows into the intermediate heat exchanger 46 from an inlet nozzle 47 and is subjected to heat-exchange with the primary coolant 26 in the intermediate heat exchanger 46 to increase the temperature thereof, the secondary coolant floe is guided from an outlet nozzle 48 to the outside of the reactor vessel 21.

Figure 15B:
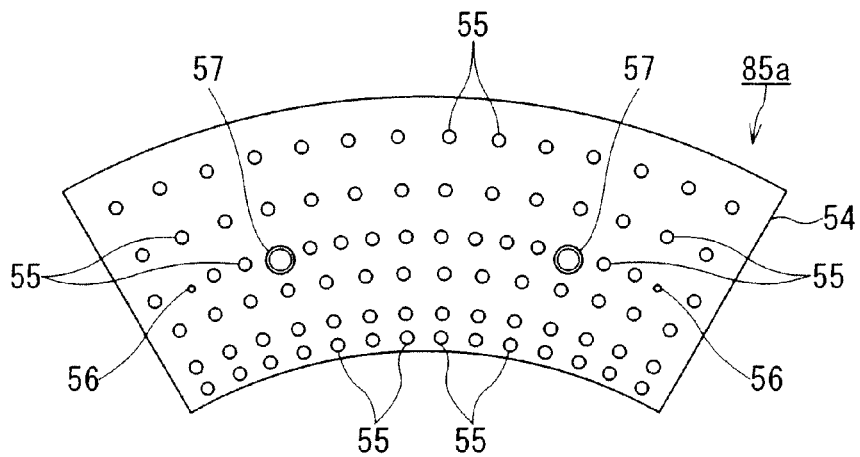

As shown in FIGS. 14A, 14B, and 15B, the respective metal plates 54 are positioned by a plurality of positioning pins 56 so that the coolant flow paths 55 pass therethrough.

Further, all the metal plates are coupled with each other by a coupling rod 57 using the metal plates 54 of the upper and lower ends of the neutron reflecting portion 85a. thus, as described above, productivity can be improved, and the expansion due to thermal stress at a normal temperature, which is generated in the respective metal plates 54, can be also suppressed to a low level by laminating the metal plates 54.

Figure 16:
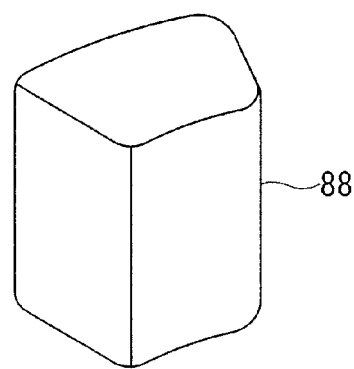
FIG. 16 is a perspective view of a box-shaped hermetically-sealed vessel disposed to the cavity portion in the upper portion of the reflector shown in FIG. 14.

On the other hand, as shown in FIGS. 15A and 16, the cavity portion 85b of the reflector 85 has a frame assembly 66 composed of beams and plates and a plurality of box-shaped hermetically-sealed vessels 88 held in the frame assembly 66. A gas such as an inert gas and the like, which has a neutron reflection capability inferior to that of the primary coolant 26, may be enclosed in the hermetically-sealed vessels 88, and a vacuum condition may be held therein. Note that, in FIGS. 14A and 14B, the hermetically-sealed vessels 88 in total of ten pieces are constructed by arranging two pieces horizontally and stacking five pieces vertically inside of the frame assembly 66 and held therein.

FIG. 16 is a perspective view of the hermetically-sealed vessel 88, and FIG. 15A is a lateral sectional view of the cavity portion 85b.

The hermetically-sealed vessel 88 may be enclosed with metal such as boron, hafnium, and tantalum, and a compound thereof, which has a neutron reflection capability inferior to that of the primary coolant 26 in addition to that it is enclosed with the gas having the neutron reflection capability inferior to that of the primary coolant 26.

Further, as shown in FIGS. 14A and 14B, an elastic member as a thermal expansion absorption means 89 is interposed between the upper end of the hermetically-sealed vessels 88 disposed to the uppermost portion of the frame assembly 66 and an upper end plate 90 of the frame assembly 66. A coil spring, a disc spring, a sheet spring and the like are used as the elastic member of thermal expansion absorption means 89.

Since thermal expansion absorption means 89 elastically restrains the laminated hermetically-sealed vessels 88 in a vertical direction and absorbs thermal expansion and thermal deformation, a load applied from thermal expansion absorption means 89 to the hermetically-sealed vessels 88 is small. Further, since the load for hanging the neutron reflecting portion 85a of the reflector 85 acts on a framework 87 of the frame assembly 66, a load acting on the hermetically-sealed vessels 88 is sufficient small. As a result, a mechanical load except the external pressure from the primary coolant 26 applied to the hermetically-sealed vessels 88 can be suppressed to a low level, so that the soundness of the hermetically-sealed vessels 88 can be kept.

Incidentally, in the mode explained in FIGS. 14A and 14B, thermal expansion absorption means 89 is interposed between the upper end of the hermetically-sealed vessels 88 disposed to the uppermost portion of the framework 87 and the end plate 90 of the framework 87. However, the present invention is not limited thereto, and thermal expansion absorption means 89 may be interposed between the lower end of the hermetically-sealed vessels 88 disposed to the lowermost portion of the framework 87 and the lower end of the framework 87.

A gap G is formed between the neutron reflecting portion 85a of the reflector 85 and the cavity portion 85b thereof. Accordingly, after the primary coolant 26 flows from the lower portion of the neutron reflecting portion 55a of the reflector 85 into the coolant flow paths 55 of the neutron reflecting portion 85a, the primary coolant flows out from the gap G to the outside of the neutron reflecting portion 85a. Further, the universal joint 51 is mounted to a center portion of the gap G.

Incidentally, the neutron reflecting portion 85a of the reflector 85 has a function for controlling the reactivity of the reactor core 25 by preventing the leakage of the neutrons from the reactor core 25. However, when the neutron reflecting portion 85a has a lot of the coolant flow paths and the substantial volume of the neutron reflecting portion 85a excluding the coolant flow paths is made smaller than 80% of the entire volume occupied by the neutron reflecting portion 85a, the leakage of the neutrons cannot be sufficiently prevented. Accordingly, it is preferable that the volume of the neutron reflecting portion 85a excluding the coolant flow paths is from 80% to 95% of the entire volume occupied by the neutron reflecting portion 85a. On the contrary, it is preferable that the volume of the coolant flow paths of the neutron reflecting portion 85 is 20 vol % or less.

Further, since the cavity portion 85b of the reflector 85 has a neutron reflection capability lower than that of the primary coolant 26, it can suppresses the reactivity of the reactor core 25 more than a case in which the reactor core 25 is covered with the primary coolant 26. However, when the volume of a construction member constituting the cavity portion 85b is made larger than 10% of the entire volume occupied by the cavity portion 85b, the neutron reaction capability thereof is increased, failing to exhibit a sufficient function. Accordingly, it is preferable that the volume of the construction member constituting the cavity portion 85b is 10 vol. % or less of the volume occupied by the cavity portion 85b.

Next, an operation of the embodiment of the arrangement mentioned above will be described.

When the electromagnetic pump 45 is driven by operating the fast reactor 20A, the primary coolant 26 is circulated in the reactor vessel 21 by the driving force of the pump. The primary coolant 26 falls in the reactor vessel 21 by driving the electromagnetic pump 45, flows into the reactor core 25 after it is reversed on the bottom of the reactor vessel 21, and rises in the reactor core 25.

While the primary coolant 26 rises in the reactor core 25, the primary coolant 26 absorbs the heat generated by the nuclear reaction of the fuel assembly 27 in the reactor core 25 and heated.

At this time, the reflector 85 is driven from an initial fallen position by the reflector drive apparatus 37 and the leakage of the neutrons generated from the reactor core 25 is adjusted by the reflector 85. Thus, the reactivity of the reactor core 25 is controlled (refer to FIG. 13). In the neutron reflecting portion 85a, gamma heat is generated by the mutual action thereof with the neutrons generated from the reactor core 25.

Since the neutron reflecting portion 85a of the reflector 85 is constructed by laminating the plurality of metal plates 54, it can disperse thermal expansion and thermal stress generated to the respective metal plates 54 so that the stress of the neutron reflecting portion 85a can be suppressed to a low level in its entirety.

Further, as shown in FIGS. 14A and 14B, since the drive shaft 36 is connected to the cavity portion 85b through the universal joint 50 and the cavity portion 85b is connected to the neutron reflecting portion 85a through the universal joint 52, the multijoint operation can be performed. Accordingly, warping, which is caused by thermal expansion due to the temperature difference of the reactor in a radius direction and in the vertical direction, can be suppressed, and accordingly, the neutron reflecting portion 85a and the cavity portion 85b can be more effectively prevented from being deformed.

Furthermore, as shown in FIGS. 14A and 14B, the elastic member as thermal expansion absorption means 89 is interposed between the upper end of the hermetically-sealed vessels 88 disposed to the uppermost portion of the frame assembly 66 of the cavity portion 85b and the upper end plate 90 of the frame assembly 66. Accordingly, the thermal expansion absorption means 89 can absorb the thermal expansion difference in the vertical direction caused between the frame assembly 66 and the hermetically-sealed vessels 88 and the displacement of the hermetically-sealed vessels 88 in the vertical direction caused by thermal expansion of the gas therein.

Next, the primary coolant 26 heated in the reactor core 25 rises in the partition wall 29 and reaches the intermediate heat exchanger 46 (refer to FIG. 1). In the intermediate heat exchanger 46, the primary coolant 26 is heat-exchanged with the secondary coolant, and the temperature thereof is reduced by heating the secondary coolant. Subsequently, the primary coolant 26 is guided by the electromagnetic pump 45 and ejected therefrom downward. The primary coolant ejected from the electromagnetic pump 45 falls in a flow path formed between the reactor vessel 21 and the partition wall 29, is reversed on the lower portion of the reactor vessel 21, and then guided to the reactor core 25 again.

The gamma heat, which is generated by the mutual action between the neutrons and the neutron reflecting portion 85a, is cooled by the primary coolant 26, and then, the temperature of the material of the neutron reflecting portion 85a can be reduced. As a result, the neutron reflecting portion 85a can be prevented from being deformed by the thermal expansion difference.

Further, in FIG. 15B, the number of the coolant flow paths 55 of the metal plates 54 is made larger on the reactor core 25 side than on the reactor vessel 21 side. Accordingly, a capability for cooling the gamma heat generated in a large amount on the reactor core 25 side can be enhanced, and accordingly, the deformation of the metal plates 54 caused by thermal expansion difference can be suppressed by making the temperature of the overall metal plates 54 uniform.

Next, the primary coolant 26 is heat-exchanged with the secondary coolant, not shown, in the intermediate heat exchanger 45 and cooled (refer to FIG. 1). As described above, the secondary coolant subjected to the heat exchanging is supplied from the outlet nozzle 48 to a not shown steam generator, and steam is generated therein for driving a turbine.

Incidentally, as shown in FIGS. 14A and 14B, the neutron reflecting portion 85a of the reflector 85 is composed of the plurality of laminated metal plates 54, and the respective metal plates 54 are coupled with each other by the positioning pins 56 and the coupling rods 57. Since the number the metal plates 54 can be appropriately adjusted according an environment in which the neutron reflecting portion 85a is used, the excellent producing property can be realized by this arrangement.

Further, since the drive shaft 36 is connected to the cavity portion 85b of the reflector 85 through the universal joint 50, and the cavity portion 85b is connected to the neutron reflecting portion 85a through the universal joint 52, the multijoint operation is performed. Accordingly, when the fast reactor 20A is shutdown in an emergency, even if the reflector 85 comes into contact with the core barrel 28 and the partition wall 29, the neutron reflecting portion 85a and the cavity portion 85b are free to be inclined by the universal joints 50, 52, thereby enhancing the follow-up moving property. As a result, the reflector 85 can be dropped within a predetermined time.

Furthermore, as shown in FIGS. 14A and 14B, the cavity portion 85b includes a plurality of independent hermetically-sealed vessels 88. Accordingly, even if any one of the hermetically-sealed vessels 88 is broken, the primary coolant 26 leaks into the broken hermetically-sealed vessel 88, and the hermetically-sealed vessels 88 cannot suppress the neutron reflection capability to a low level, the influence of the accident on the control of the reaction of the reactor core 25 can be minimized.

Further, in third embodiment, although an example in which the vacuum or the gas such as an inert gas is enclosed in the hermetically-sealed vessels 88, a substance having a neutron reflection capability inferior to that of the coolant may be accommodated in the hermetically-sealed vessels 88. The substance having the inferior neutron reflection capability may be a metal such as boron, hafnium, tantalum, and the like and a compound thereof.

Furthermore, the frame assembly 66 of the cavity portion 85b must have sufficient strength to hold the hermetically-sealed vessels 88. Since the frame assembly 66 of the cavity portion 85b is located in the vicinity of the reactor core 25, it is swelled or the toughness of the material thereof is deteriorated by radiation. Accordingly, chromium-molybdenum steel, in particular, 9Cr-1 Mo steel, 9Cr-1Mo-V steel as improved 9Cr-1Mo steel and the like, which are excellent in strength at high temperature and radiation resistance, are used as the material of the frame assembly 66.

Further, although the frame assembly 66 is manufactured by welding, when the framework 87 of the frame assembly 66 is manufactured by welding as described, it is not denied that the strength of the welding framework 87 is lowered and the framework 87 is broken because the chromium-molybdenum steel is liable to be cracked in welding.

Thus, the respective frameworks 87 may be arranged as a unit using bolts and the like in place of welding to thereby manufacture a frame assembly unit. Furthermore, since the respective frame assembly units are coupled with each other using bolts and the like, the frameworks 87 can be easily disassembled, inspected, and replaced.

[Fourth Embodiment]

Figure 17:
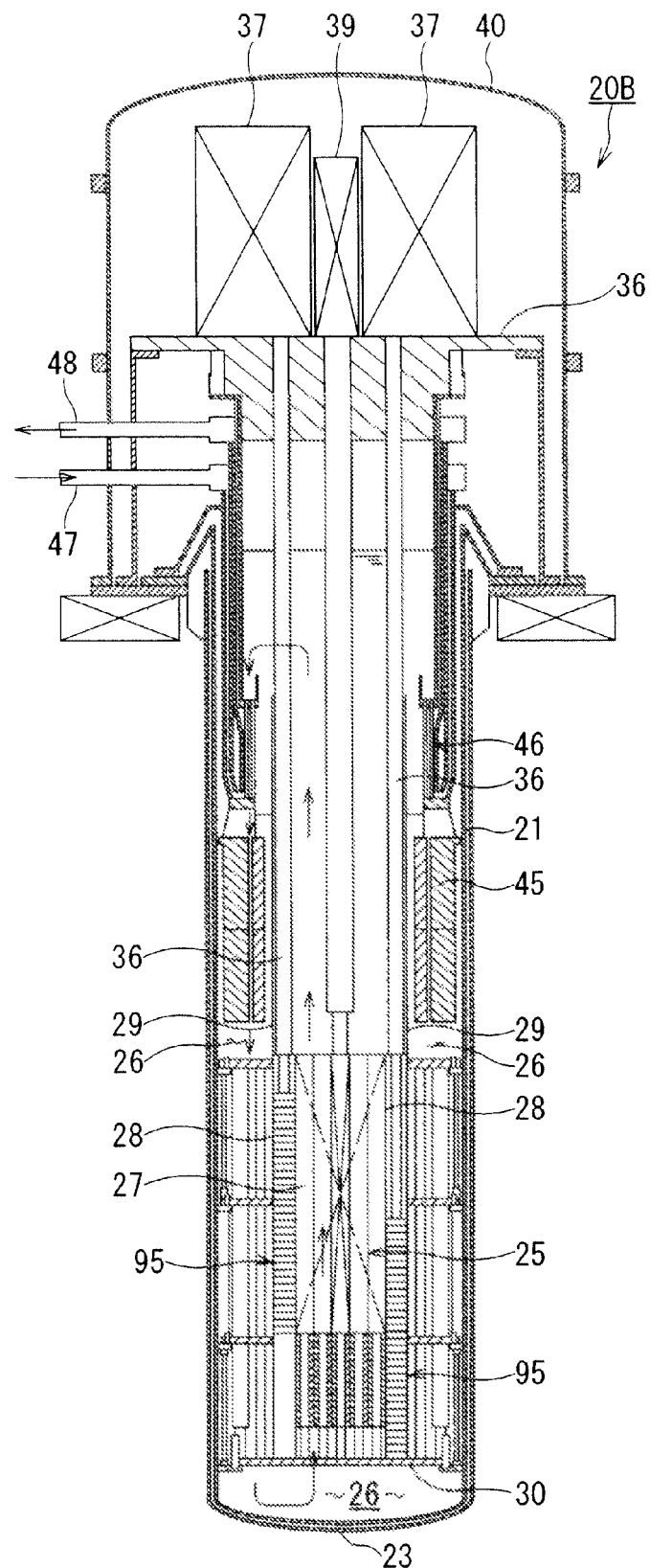
FIG. 17 is a longitudinal sectional view showing the third embodiment of the fast reactor having the reactivity control reflector according to the present invention.
Figures 18A, 18B:
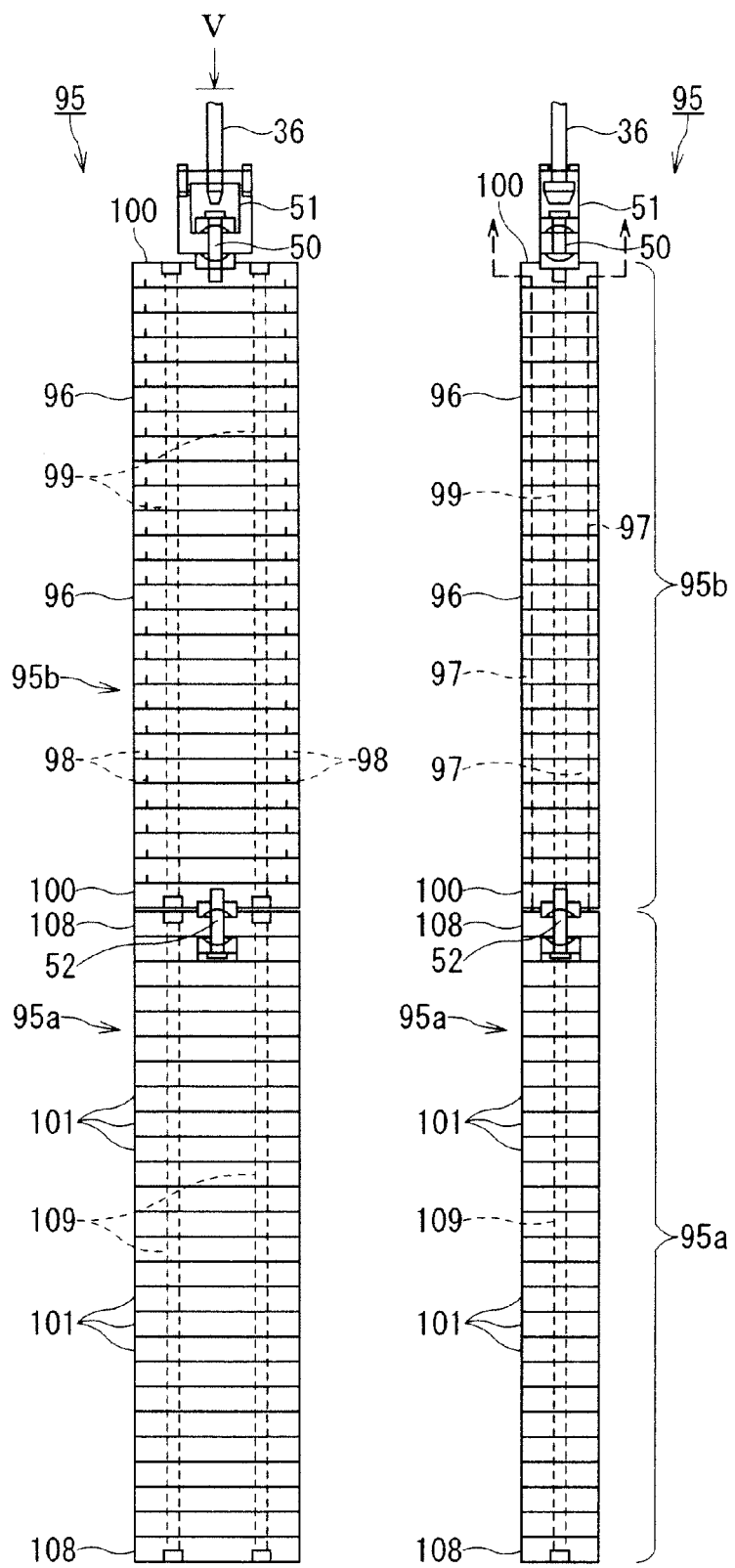

FIGS. 17 to 18B show a fourth embodiment of the fast reactor having the reactivity control reflector according to the present invention.

Since a fast reactor 20B of this embodiment has a feature in the structure of a reflector provided with the reactor vessel, and the other arrangement is not substantially different from that of the fast reactor 20 of the first embodiment, the same arrangements are denoted by the same reference numerals and the explanation of the fast reactor 20B is omitted or simplified.

FIG. 17 is a longitudinal sectional view of the fast reactor 20B having a reactivity control reflector, FIGS. 18A and 18B show the reflector 95 provided for the fast reactor 20 of FIG. 17B, FIG. 17A is a front elevational view, and FIG. 17B is a side elevational view.

In the fast reactor 20B having the reactivity control reflector shown in FIG. 17, a reactor core 25 is accommodated in a reactor vessel 21 which is filled with liquid sodium as a primary coolant. The reactor core 25 has a nuclear fuel assembly 27 disposed therein and formed in a column shape in its entirety. The outside of the reactor core 25 is surrounded by a core barrel 28 for protection.

A columnar partition wall 29 is installed outside of the core barrel 28. The partition wall 29, the reactor core 25 and the core barrel 28 are supported on a reactor core support plate 30. The reflector 95 formed in a cylindrical or annular shape in its entirety is installed between the partition wall 29 and the core barrel 28. Further, coolant flow paths of a primary coolant 26 is annularly formed between the partition wall 29 and the reactor vessel 21, and neutron shield bodies 41 supported by the reactor core support plate 30 are disposed in the coolant flow paths. The neutron shield bodies 41 shield the neutrons radiated from the reactor core 25 passing through or bypassing the reflector 95. Further, a guard vessel 23 is installed outside of the reactor vessel 21 for protecting the reactor vessel 2.

In the reactor vessel 21, an electromagnetic pump 45 is installed above the neutron shield bodies 41, and an intermediate heat exchanger 46 is installed above the electromagnetic pump 45. The electromagnetic pump 45 circulates the primary coolant 26 in the reactor vessel 21 so as to flow from an upper side to a lower side in the coolant flow paths as shown by solid arrows. Further, the primary coolant and a secondary coolant flow on the tube side of the intermediate heat exchanger 46 and on the shell side thereof, respectively, so as to perform heat exchanging operation.

The reflector 95 is driven by a reflector drive apparatus 37 through a drive shaft 36 so as to move in the axial direction of the reactor core 25, that is, in the vertical direction of the fast reactor 20B. As also shown in FIGS. 16 and 17, the drive shaft 36 is coupled with the reflector 95 through a joint 51 and a universal joint 50 and extends in the vertical direction of the reactor vessel 21 passing through an upper plug 36 for closing the upper portion thereof. Further, the reflector drive apparatus 37 is installed on an upper plug 36. The reflector adjusts the leakage of the neutrons from the reactor core 25 by moving in the vertical direction of the fast reactor 20B and controls the reactivity of the reactor core 25.

That is, the reflector 95 is composed of a lower neutron reflecting portion 95a for reflecting the neutrons emitted from the reactor core 25 and an upper neutron absorbing portion 95b having a neutron reflection capability lower than that of the primary coolant. The neutron reflecting portion 95a reflects the neutrons emitted from the reactor core 25 and accelerates the combustion and breeding of the nuclear fuel in the reactor core 25. At the beginning of operation of the fast reactor 20B, the neutron reflecting portion 95a of the reflector 95 is located at a lower position with respect to the reactor core 25 and moves upward as an operation period passes so that a fresh fuel portion in the reactor core 25 is gradually combusted to thereby compensate the deterioration of the reactivity of the reactor core 25.

When the fast reactor 20B is operated, the primary coolant 26 in the reactor vessel 21 takes out the heat generated through the nuclear fission of the fuel assembly 27 to the outside while cooling the reactor core 25. As shown by the solid arrows, the primary coolant 26 flows downward in the coolant flow paths by the electromagnetic pump 45, flows in the neutron shield bodies, and then reaches the bottom of the reactor vessel 21. The primary coolant 26 is reversed on the bottom of the reactor vessel 21, reaches the reactor core 25, rises in the reactor core 25 while increasing the temperature thereof, and then flows to the tube side of the intermediate heat exchanger 46. After the primary coolant is heat-exchanged with the secondary coolant in the intermediate heat exchanger 46, it is caused to fall again in the coolant flow paths by the electromagnetic pump 45.

After the secondary coolant flows to the shell side of the intermediate heat exchanger 46 through an inlet nozzle 47 and heated by the primary coolant flowing on the tube side of the intermediate heat exchanger 46, it flows out to the outside from an outlet nozzles 48, and the heat thereof is converted into power utilized for a turbine and the like. In FIG. 16, a reactor shut-off rod 38 is driven by a reactor shut-off rod driving apparatus 39 installed on the upper plug 36.

Incidentally, as shown in FIGS. 18A and 18B, the upper neutron absorbing portion 95b in the reflector 95 is composed of laminated hafnium plates 96 as neutron absorbing metal plates 96. Although any one kind of hafnium, boron, or tantalum may be preferably utilized as the neutron absorbing metal plates 96 for absorbing neutrons, hafnium is used in the present embodiment.

As shown in FIG. 18B, a plurality of coolant flow paths 97 are formed to the hafnium plates 96, two through holes, for example, are formed thereto, and further positioning pins 98 are provided therefore. The respective hafnium plates 96 are positioned by the positioning pin 98 so that the coolant flow paths 97 communicate with each other. In this state, coupling rods 99 shown in FIGS. 18A and 18B are inserted into the through holes of a plurality of hafnium plates 91, and both the ends of the coupling rods 99 are fixed to the metal plates (end plates) 100 disposed to both the upper and lower ends of the neutron absorbing portion 95b so that the plurality of laminated hafnium plates 96 are coupled with each other.

As described above, since the neutron absorbing portion 95b is constructed by laminating the hafnium plates 96, the productivity of the neutron absorbing portion 95b is improved. In addition, the thermal expansion and thermal stress generated in the neutron absorbing portion 95b can be suppressed to a low level by dispersing and absorbing them to and by the hafnium plates 96.

Further, the gamma heat, which is generated by the mutual action between the neutrons and the hafnium plates 96, is cooled by the primary coolant flowing in the plurality of coolant flow paths 97 of the respective hafnium plates 96 so as to lower the temperature of the neutron absorbing portion 95b.

Figure 19:
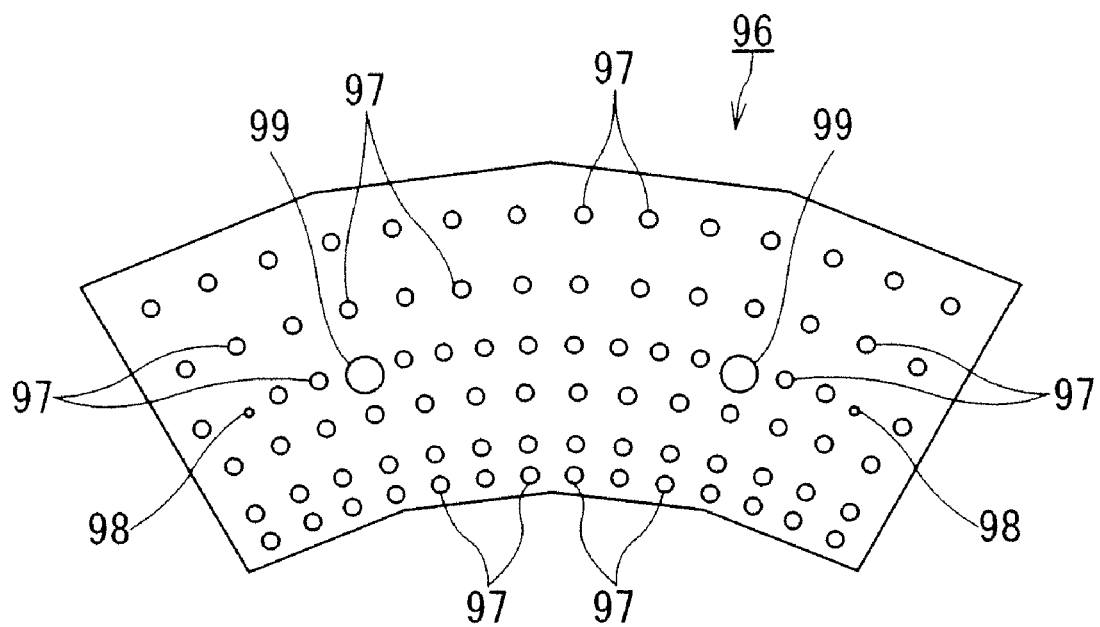
FIG. 19 is a plan sectional view showing a cavity portion in the upper portion of the reflector shown in FIG. 18.

As shown in FIG. 19, the number of the plurality of coolant flow paths 97 formed to the hafnium plates 96 is larger on the reactor core 25 side than on the reactor vessel 21 side. With this arrangement, the cooling capability of the coolant to the gamma heat, which is generated in a large amount on the reactor core 25 side of the respective hafnium plates 96, can be enhanced, and accordingly, the overall temperature of the hafnium plates 96 can be made uniform. At the same time, the deformation of the hafnium plates 96, which is caused by the difference of thermal expansions thereof between the reactor core 25 side and the reactor vessel 21 side, can be suppressed.

Moreover, since the neutron absorbing portion 95b of the reflector 95 is composed of the hafnium plates 96, the neutron absorbing portion 95b can be prevented from being broken, and the insertion (i.e., increase) of core reactivity, which is caused by replacing the neutron absorbing portion 95b with the primary coolant, can be avoided. However, since the hafnium plates 96 slightly reflects the neutrons, the difference of neutron reflection capabilities between the neutron reflecting portion 95a and the neutron absorbing portion 95b is reduced, thereby reducing the reactivity control capability of the reflector by about 30%.

To cope with the above problem, in the present embodiment, since the lower neutron reflecting portion 95a of the reflector 95 is constructed using SiC (silicon carbide), which has a neutron reflection capability higher than that of ferrite stainless steel as well as can increase the reactivity of the reactor core 25 by moderating neutrons when they are reflected, to the neutron reflecting portion 95a, the reactivity control capability of the reflector 95 can be increased (about 30 to 40%).

That is, as shown in FIGS. 18A, 18B, 20A, and 20B, the neutron reflecting portion 95a of the reflector 95 is constructed by laminating reflecting elements 101. The respective reflecting elements 101 are constructed by accommodating a lot of blocks 103 each composed of a SiC material in an accommodation box 102 composed of ferrite stainless steel. A plurality of through holes 105 are formed to the respective reflecting elements 101. Ferrite stainless steel coupling rods 109 are inserted into these through holes 105 so that the respective reflecting elements 101 are positioned. In the state, since both the ends of the coupling rods 109 are fixed to metal plates 108 disposed to both the upper and lower ends of the lower neutron reflecting portion 95a, the plurality of laminated reflecting elements 107 are coupled with each other and a coupling unit is formed. It is also preferable to compose the metal plates 108 of ferrite stainless steel.

Figure 20A:
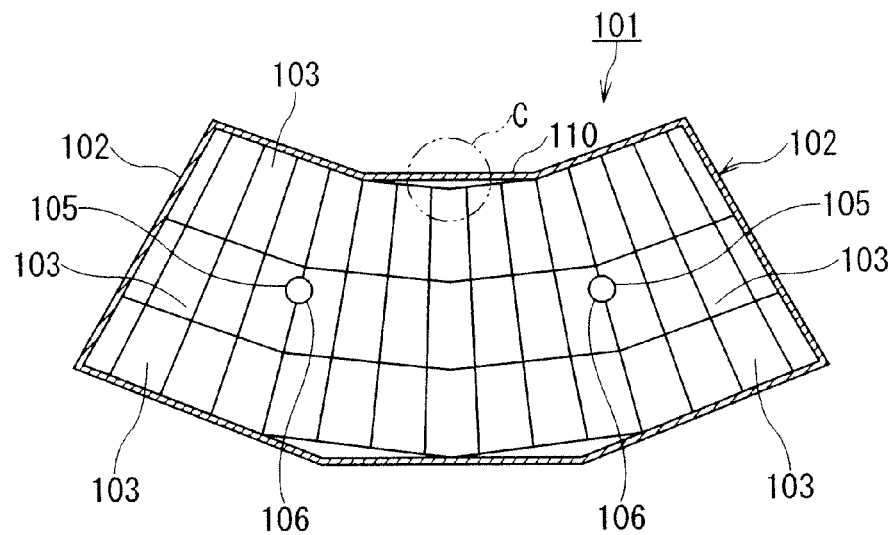
Figure 20B:
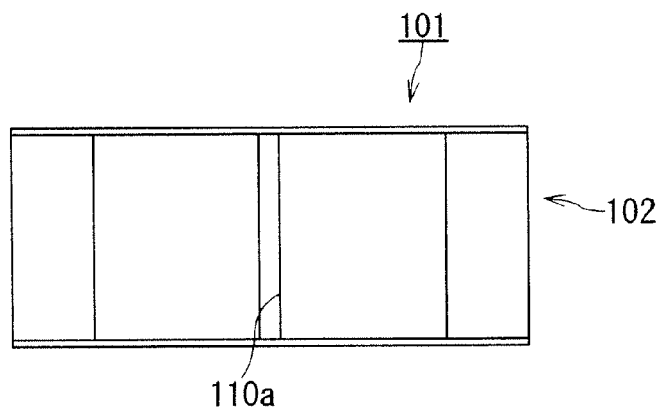
Figure 20C:
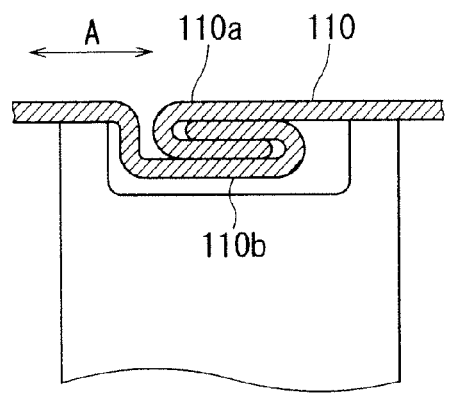
Figure 21:
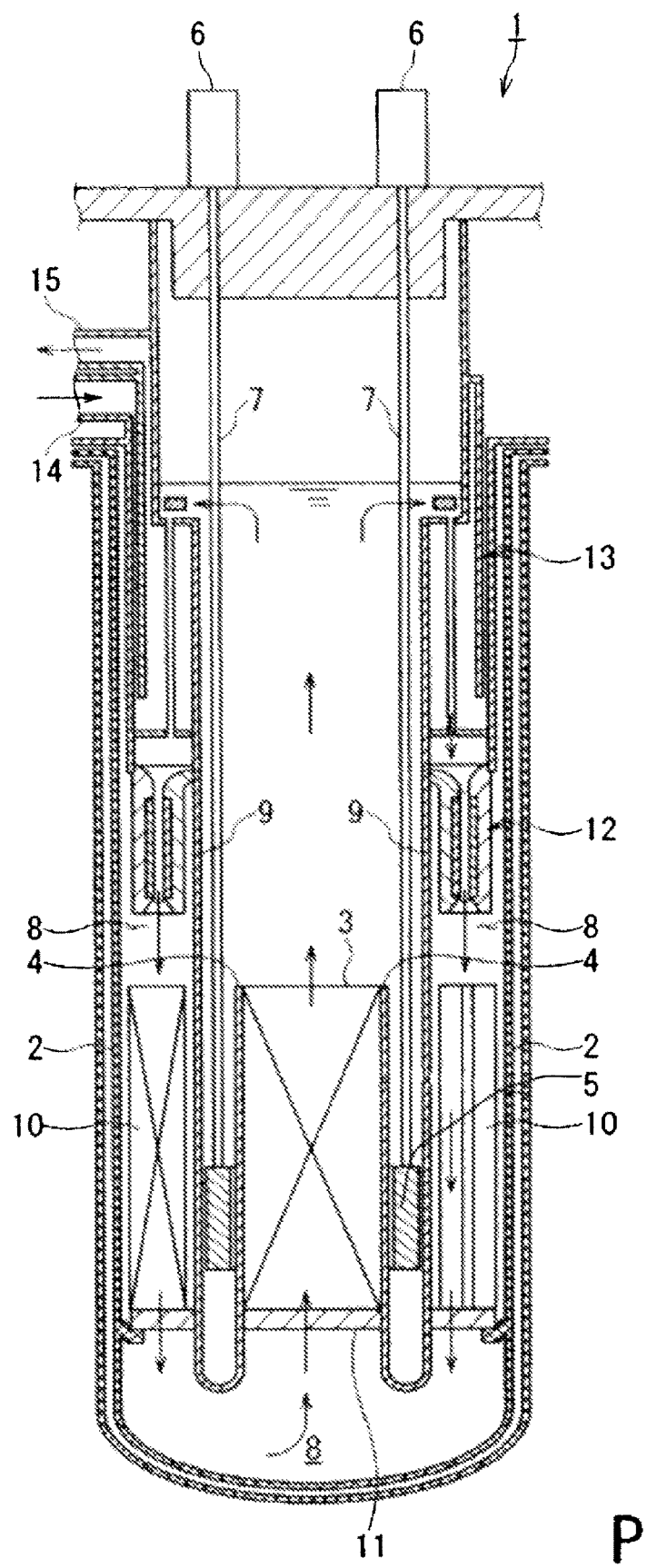
FIG. 21 is a longitudinal sectional view simply showing a conventional fast reactor having a reactivity control reflector.
Figure 22:
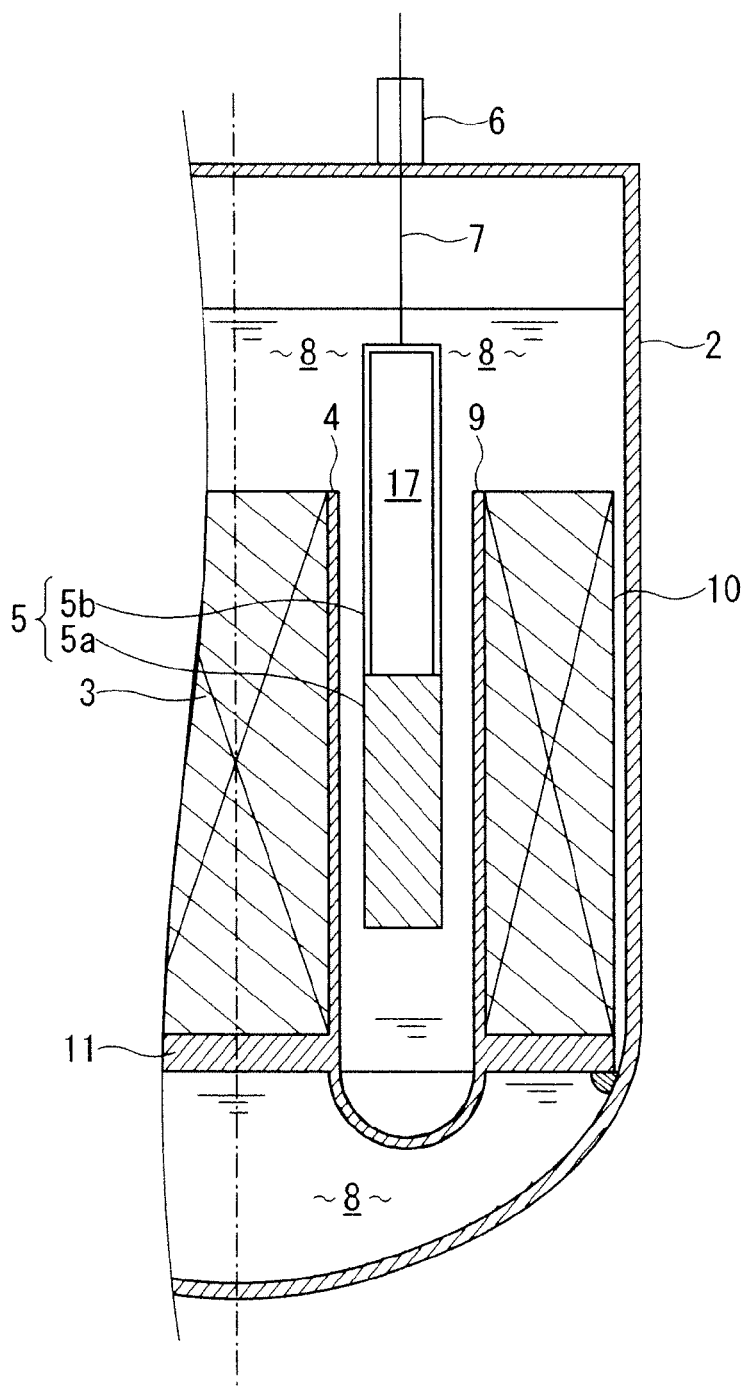
FIG. 22 shows the conventional fast reactor having the reactivity control reflector and is a partial view showing a longitudinal cross section of a side on which a reflector and a neutron shield body are installed around a reactor core.

The accommodation box 102 of the respective reflecting elements 101 is arranged to such a structure that the primary coolant can flow thereinto and flow out therefrom as well as absorb the thermal deformation. That is, end portions 110a, 110b, which are coupled with each other, are formed to a side plate 110 of the accommodation box 102 in a U-shape and engaged with each other. The primary coolant can flow in and out from a gap between both the engaged end portions 110a and 110b. Further, the thermal deformation of the accommodation box 102 are absorbed by moving the side plate 110 in a direction that is parallel to the surface of the side plate 110 (direction of arrow "A" in FIG. 20C) in the state that both the ends 110a and 110b are engaged with each other.

Further, the opening of the accommodation box 102 is closed by a press plate 112 (refer to part B of FIG. 20)

In the fast reactor 20B of the present embodiment, since the neutron absorbing portion 95b of the reflector 95 is composed of the hafnium plates 96 for absorbing neutrons, soundness of structure can be improved by preventing the breakage thereof. As a result, since the neutron absorbing portion 95b is not replaced with the primary coolant by being broken to prevent insertion (increase) of the core reactivity, a high reliable fast reactor 20B can be realized.

Further, since the lower neutron reflecting portion 95a of the reflector 95 is arranged such that the lot of blocks 103 composed of the SiC material are disposed in the accommodation box 102, the lower neutron reflecting portion 95a has a function for increasing the reactivity of the reactor core 25 by modulating neutrons in addition to the improvement of a function for reflecting the neutrons from the reactor core 25. As a result, even if the neutron absorbing portion 95b of the reflector 95 is composed of the hafnium plate and slightly reflects neutrons, the reactivity control capability of the reflector 95 can be increased because the difference of capabilities for controlling the reactivity of the reactor core 25 between the lower neutron reflecting portion 95a and the upper neutron absorbing portion 95b and the reactivity control capability of the reflector 25 is increased, thus realizing the fast reactor 20B having a high performance.

The accommodation box 102 of the respective reflecting elements 101 in the lower neutron reflecting portion 95a of the reflector 95 is arranged to such a structure that it permits the primary coolant to flow therein and flow out therefrom as well as absorbs thermal deformation, and accordingly, the SiC blocks 103 in the accommodation box 102 can be well cooled by the primary coolant as well as can prevent the damage of the accommodation box 102 caused by thermal deformation.

The accommodation box 102 for accommodating the SiC blocks 103 of the neutron reflecting portion 95a and the coupling rods 106 are composed of ferrite stainless steel. The ferrite stainless steel is resistant to radiation and is less swollen, thus preventing the deformation and breakage of the accommodation box 102 even if the reflector 95 is used for a long period.

It is to be noted that although the fourth embodiment shows the example in which the reflecting elements 1011 of the lower neutron reflecting portion 95b of the reflector 95 use the SiC blocks 103, the blocks 103 in the neutron reflecting portion 95a may be composed of a Ni material or a Ni alloy material mainly containing Ni. In this case, the neutron reflection capability of the blocks 103 is higher than that of ferrite stainless steel likewise the SiC material, though they do not have a function for moderating reflected neutrons. Accordingly, even if the neutron absorbing portion 95b of the reflector 95 is composed of the hafnium plates 96 and slightly reflects neutrons, the difference of the neutron reflection capabilities between the neutron reflecting portion 95a and the neutron absorbing portion 95b can be set well. As a result, the reactivity control capability of the reflector 95 can be secured well and a fast reactor 20B having an excellent performance can be realized.

In the fast reactor having the reactivity control reflector of the fourth embodiment, since the neutron reflecting portion of the reflector is composed of the material mainly composed the SiC material or Ni, the function for reflecting the neutrons from the reactor core cam be improved as well as the function for increasing the core reactivity by moderating fast neutrons resulting from a nuclear reaction. As a result, the reactivity control capability of the reflector can be increased to thereby realize a fast reactor having an excellent performance.

Furthermore, since the upper neutron absorbing portion of the reflector is composed of the neutron absorbing metal for absorbing neutrons, soundness of structure can be improved by preventing the breakage of the neutron absorbing portion. As a result, even if the neutron absorbing portion is broken, since it is not replaced with the coolant and an increase of the core reactivity can be prevented, a highly reliable fast reactor with a long life can be provided.

Furthermore, in the respective embodiments of the fast reactor having the reactivity control reflector according to the present invention, although it is described that the reflector as the neutron reflector excellent in soundness of structure is installed outside of the reactor core so as to free to rise and fall, in a modification, it may be possible to variously modify the axial length between the lower neutron reflecting portion of the reflector and the upper cavity portion or the upper neutron absorbing portion thereof according to a design condition.

What is claimed is:

1. A fast reactor having a reactivity control reflector comprising:
   a reactor vessel in which a coolant is accommodated;
   a reactor core in the reactor vessel dipped with the coolant;
   a core barrel surrounding the outside of the reactor core;
   a partition wall spaced apart from and parallel to the core barrel; and
   a reflector interposed between the core barrel and the partition wall, outside the reactor core, and surrounding only a portion of the reactor core so that the reflector moves around a periphery of the reactor core in a vertical direction to control reactivity of the reactor core, the reflector being cylindrically shaped,
   wherein the reflector has a lower neutron reflecting portion having a neutron reflection capability higher than that of the coolant and an upper cavity portion located above the lower neutron reflecting portion and having a neutron reflection capability lower than that of the coolant, and the upper cavity portion is composed of a plurality of hermetically-sealed vessels, and
   wherein the hermetically-sealed vessels are cylindrically shaped,
   wherein the upper cavity portion includes a frame assembly that surrounds peripheries of the hermetically-sealed vessels, supports the lower neutron reflecting portion and restrains the upper cavity portion in a horizontal direction,
   wherein the hermetically-sealed vessels are surrounded by supporting rods and are arranged side by side, stacked and accommodated in the frame assembly where the frame assembly includes a coupling member and the supporting rods.

2. The fast reactor having the reactivity control reflector according to claim 1, wherein the lower neutron reflecting portion comprises a plurality of laminated metal plates, and the laminated metal plates have a plurality of coolant flow paths in which the coolant flows.

3. The fast reactor having the reactivity control reflector according to claim 1, wherein the lower neutron reflecting portion comprises a plurality of laminated metal plates or SiC plates, and each of the laminated metal plates includes metal mainly composed of chromium-molybdenum steel, nickel steel, nickel or includes Inconel.

4. The fast reactor having the reactivity control reflector according to claim 1, wherein the lower neutron reflecting portion comprises a plurality of laminated metal plates or SiC plates to which a plurality of coolant flow paths, in which the coolant flows, are formed so as to communicate with each other.

5. The fast reactor having the reactivity control reflector according to claim 4, wherein a number of the plurality of coolant flow paths is larger on a reactor core side than on a reactor vessel side.

6. The fast reactor having the reactivity control reflector according to claim 1, wherein the reflector is arranged such that a plurality of pads are disposed around the upper and lower ends of the lower neutron reflecting portion and the upper cavity portion.

7. The fast reactor having the reactivity control reflector according to claim 1, wherein the hermetically-sealed vessels comprise convex portions or recessed portions formed to the upper and lower ends thereof, and horizontal movement of the hermetically-sealed vessels is configured to be restrained by connecting the hermetically-sealed vessels to each other in a columnar state by concave/convex engagement or engagement coupling through a framework.

8. The fast reactor having the reactivity control reflector according to claim 1, wherein upper and lower end plates are disposed to the hermetically-sealed vessels disposed to the upper cavity portion, the upper and lower end plates are integrally welded to the hermetically-sealed vessels, and the upper cavity portion is divided into a plurality of segments.

9. The fast reactor having the reactivity control reflector according to claim 1, wherein the reflector is arranged such that the upper cavity portion is formed on an extending line above a region of the lower neutron reflecting portion, and the hermetically-sealed vessels having a maximum diameter are disposed in a region of the upper cavity portion.

10. The fast reactor having the reactivity control reflector according to claim 1, wherein the reflector is arranged such that the hermetically-sealed vessels having a plurality of different diameters are disposed so that a volume occupied by the space in the hermetically-sealed vessels is 80% or more of an entire volume of the upper cavity portion.

11. The fast reactor having the reactivity control reflector according to claim 1, wherein the upper cavity portion is arranged such that the hermetically-sealed vessels are disposed in a horizontal direction so that influence on the core reactivity is reduced at a time of breaking any one of the hermetically-sealed vessels.

12. The fast reactor having the reactivity control reflector according to claim 1, further comprising a joint, configured to absorb thermal expansion, deformation and vibration, that couples the lower neutron reflecting portion to the upper cavity portion.

13. The fast reactor having the reactivity control reflector according to claim 1, further comprising a thermal expansion absorption element, attached to at least one of an upper portion and a lower portion of the upper cavity portion, configured to absorb thermal expansion in a vertical direction and absorb displacement of the hermetically-sealed vessels in the vertical direction.

14. The fast reactor having the reactivity control reflector according to claim 13, wherein the thermal expansion absorption element comprises one of a coil spring, a disk spring and a sheet spring.

* * * * *